(12) United States Patent
Christoffersson et al.

(10) Patent No.: US 12,696,325 B2
(45) Date of Patent: Jul. 28, 2026

(54) METHODS, UE AND NETWORK NODE FOR HANDLING PRACH CONFIGURATIONS

(71) Applicant: Telefonaktiebolaget LM Ericsson (publ), Stockholm (SE)

(72) Inventors: Jan Christoffersson, Luleå (SE); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 686 days.

(21) Appl. No.: 17/765,019

(22) PCT Filed: Aug. 25, 2020

(86) PCT No.: PCT/SE2020/050813
§ 371 (c)(1),
(2) Date: Mar. 30, 2022

(87) PCT Pub. No.: WO2021/066697
PCT Pub. Date: Apr. 8, 2021

(65) Prior Publication Data
US 2022/0338273 A1       Oct. 20, 2022

Related U.S. Application Data

(60) Provisional application No. 62/907,744, filed on Sep. 30, 2019.

(51) Int. Cl.
*H04W 74/0833*       (2024.01)
*H04L 27/26*       (2006.01)
(Continued)

(52) U.S. Cl.
CPC ..... *H04W 74/0841* (2013.01); *H04L 27/2605* (2013.01); *H04W 72/0453* (2013.01); *H04W 74/0816* (2013.01); *H04W 74/0866* (2013.01)

(58) Field of Classification Search
CPC ......... H04W 74/0841; H04W 74/0816; H04W 74/0866; H04W 72/0453; H04L 27/2605
(Continued)

(56) References Cited

U.S. PATENT DOCUMENTS

2016/0270108 A1* 9/2016 Dinan .................... H04L 5/0082
2019/0053271 A1* 2/2019 Islam .................... H04L 5/0048
(Continued)

FOREIGN PATENT DOCUMENTS

EP          3099132 A1    11/2016
WO     WO 2016/161408 A1    10/2016
(Continued)

OTHER PUBLICATIONS

International Search Report and Written Opinion of the International Searching Authority, PCT/SE2020/050813, mailed Nov. 5, 2020, 10 pages.
(Continued)

*Primary Examiner* — Chi Tang P Cheng
(74) *Attorney, Agent, or Firm* — Sage Patent Group

(57)       ABSTRACT
The present disclosure relates to telecommunications. In one of its aspects, the disclosure concerns a method performed by a User Equipment (UE) in a communication system. The method includes obtaining a Physical Random Access Channel (PRACH) configuration. The PRACH configuration indicates that the PRACH comprises at least one offset. The method further includes applying the PRACH configuration.

18 Claims, 13 Drawing Sheets

(51) Int. Cl.
*H04W 72/0453* (2023.01)
*H04W 74/08* (2009.01)
*H04W 74/0816* (2024.01)

(58) Field of Classification Search
USPC ........................................................ 370/329
See application file for complete search history.

(56) References Cited

U.S. PATENT DOCUMENTS

2020/0100299 A1\* 3/2020 Loehr ................... H04L 5/0094
2021/0112604 A1\* 4/2021 Bao ....................... H04W 74/04
2022/0217783 A1\* 7/2022 Liu ................... H04W 74/0833

FOREIGN PATENT DOCUMENTS

WO WO 2019/050316 A1 3/2019
WO WO 2019/099443 A1 5/2019

OTHER PUBLICATIONS

3rd Generation Partnership Project; Technical Specification Group Radio Access Network; NR; Medium Access Control (MAC) protocol specification (Release 15) 3GPP TS 38.321 V15.6.0 (Jun. 2019) 78 pages.
3rd Generation Partnership Project; Technical Specification Group Radio Access Network; Study on NR-based access to unlicensed spectrum (Release 16) 3GPP TR 38.889 V16.0.0 (Dec. 2018) 119 pages.
3rd Generation Partnership Project; Technical Specification Group Radio Access Network; NR; Medium Access Control (MAC) protocol specification (Release 15) 3GPP TS 38.321 V15.5.0 (Mar. 2019) 78 pages.

\* cited by examiner

METHODS, UE AND NETWORK NODE FOR HANDLING PRACH CONFIGURATIONS

CROSS REFERENCE TO RELATED APPLICATIONS

This application is a 35 U.S.C. § 371 national stage application of PCT International Application No. PCT/SE2020/050813 filed on Aug. 25, 2020, which in turn claims domestic priority to U.S. Provisional Patent Application No. 62/907,744, filed on Sep. 30, 2019, the disclosures and content of which are incorporated by reference herein in their entirety.

TECHNICAL FIELD

Embodiments herein relate generally to a User Equipment (UE), a method performed by the UE, a network node and a method performed by the network node. More particularly, the embodiments herein relate to handling Physical Random Access Channel (PRACH) configurations.

BACKGROUND

Next generation (NR) systems are expected to support a wide range of use cases with varying requirements ranging from fully mobile devices to stationary Internet of Things (IoT) devices or fixed wireless broadband devices. The traffic pattern associated with many use cases is expected to comprise short or long bursts of data traffic with varying length of waiting period in between, here called inactive state. In NR, both license assisted access and standalone operation in NR-unlicensed spectrum (NR-U) are to be supported in Third Generation Partnership Project (3GPP). Hence, the procedure of PRACH transmission and/or scheduling request (SR) transmission in unlicensed spectrum shall be investigated in 3GPP.

With network operation in unlicensed spectrum follows a number of restrictions. One of them is that a device, e.g. a radio network node or a UE, has to monitor the shared medium, i.e. the channel, and determine that it is free (not being used by any other device) before starting to transmit on the channel. This procedure is referred to as Listen-Before-Talk (LBT) or Clear Channel Assessment (CCA). The procedure is also referred to as Listen Before Transmit.

In the following, NR-U and channel access procedure for an unlicensed channel based on LBT is introduced.

NR-U Introduction

In order to tackle the ever-increasing data demand, NR is considered for both licensed and unlicensed spectrum. Compared to Long Term Evolution (LTE) Licensed Assisted Access (LAA), NR-U also needs to support Dual Connectivity (DC) and standalone scenarios, where the Medium Access Control (MAC) procedures comprising Random Access Channel (RACH) and scheduling procedure on unlicensed spectrum are subject to LBT and thus potential LBT failures. In LTE LAA, there are no such issues since the RACH and scheduling related signaling may be transmitted on the Primary Cell (PCell) in licensed spectrum instead of unlicensed spectrum.

For Discovery Reference Signal (DRS) transmission such as Primary Synchronization Signal/Secondary Synchronization Signal (PSS/SSS), Physical Broadcast Channel (PBCH), Channel State Information-Reference Signal (CSI-RS), control channel transmission such as Physical Uplink Control Channel/Physical Downlink Control Channel (PUCCH/PDCCH), such as PUSCH/PDSCH, and uplink Sounding Reference Signal (SRS) such as SRS transmission, channel sensing should be applied to determine the channel availability before the physical signal is transmitted using the channel.

The Radio Resource Management (RRM) procedures in NR-U would be generally rather similar to those in LAA, since NR-U is aiming to reuse LAA/eLAA/feLAA technologies as much as possible to handle the coexistence between NR-U and other legacy Radio Access Technologies (RATs). RRM measurements and report comprising special configuration procedure with respect the channel sensing and channel availability.

Hence, channel access/selection for LAA was one of the important aspects for co-existence with other RATs such as Wi-Fi. For instance, LAA has aimed to use carriers that are congested with Wi-Fi.

Channel Access Procedure in NR-U

LBT is designed for unlicensed spectrum co-existence with other RATs. In this mechanism, a radio device applies a CCA check, i.e. channel sensing, before any transmission. The transmitter involves Energy Detection (ED) over a time period compared to a certain energy detection threshold, e.g. ED threshold, in order to determine if a channel is idle. In case the channel is determined to be occupied, the transmitter performs a random back-off within a contention window before next CCA attempt. In order to protect the Acknowledgement (ACK) transmissions, the transmitter must defer a period after each busy CCA slot prior to resuming back-off. As soon as the transmitter has grasped access to a channel, the transmitter is only allowed to perform transmission up to a maximum time duration, namely, the Maximum Channel Occupancy Time (MCOT). For Quality of Service (QoS) differentiation, a channel access priority based on the service type has been defined. For example, four LBT priority classes are defined for differentiation of channel access priorities between services using different Contention Window Sizes (CWS) and MCOT durations.

As described in 3GPP TR 38.889 V16.0.0 (2018-12), the channel access schemes for NR-based access for unlicensed spectrum may be classified into at least some of the following categories (cat):

Cat-1: Immediate transmission after a short switching gap
This is used for a transmitter to immediately transmit after an Uplink/Downlink (UL/DL) switching gap inside a COT.
The switching gap from reception to transmission is to accommodate the transceiver turnaround time and is no longer than 16 µs.

Cat-2: LBT without random back-off
The duration of time that the channel is sensed to be idle before the transmitting entity transmits is deterministic.

Cat-3: LBT with random back-off with a contention window of fixed size
The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Cat-4: LBT with random back-off with a contention window of variable size
The LBT procedure has the following as one of its components. The transmitting entity draws a random number N within a contention window. The size of contention window is specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes may be used.

RACH Procedures in NR Unlicensed Spectrum

The ordinary four-step Random Access (RA) has been the current standard for legacy systems such as LTE and NR Rel-15. It has been proposed to study a two-step procedure where the UL messages, e.g. Physical Random Access Channel (PRACH) and/or Msg3, are sent simultaneously and similarly the two DL messages, e.g. time advance command in RAR and contention resolution information, are sent as a simultaneous response in the DL. In the legacy 4-step procedure, one purpose of the first two messages is to obtain UL time alignment for the UE. In many situations, e.g. in small cells or for stationary UEs, this may not be needed since either a TA=0 will be sufficient (small cells) or a stored TA value from the last RA may serve also for the current RA (stationary UE). TA is short for Timing Advance and is a parameter. TA may be described as a negative offset used by the UE and is the time between the start of a received downlink sub frame and a transmitted uplink sub frame. In future radio networks it may be expected that these situations are common, both due to dense deployments of small cells and due to a great number of e.g. stationary IoT devices. A possibility to skip the message exchange in cases there is no need to obtain the TA value would lead to reduced RA latency and would be beneficial in several use cases, for example when transmitting infrequent small data packets. On the other hand, the 2-step RA will consume more resources since it uses contention-based transmission of the data. This means that the resources that are configured for the data transmission may often be unused.

If both the 4-step and 2-step RA are configured in a cell, and for the UE, the UE will choose its preamble from one specific set if it wants to do a 4-step RA, and from another set if it wants to do a 2-step RA. Hence, a preamble partition is done to distinguish between 4-step and 2-step RA. Alternatively, the PRACH configurations are different for the 2-step and 4-step RA procedure, in which case it may be deduced from where the preamble transmission is done if the UE is doing a 2-step or 4-step procedure.

Legacy 4-Step Random Access

The legacy 4-step RA has been used in LTE and is also proposed as baseline for NR. The principle of this procedure is shown in FIG. 1. The network node 101 illustrated in FIG. 1 may be e.g. a eNB, gNB, NB, or any other radio access node or access node or other suitable node.

Step 1: Preamble Transmission

The UE 103 randomly selects a RA preamble, e.g. PRE-AMBLE_INDEX, which is then transmitted by the UE 103 to the network node 101. When the network node 101 detects the preamble, it estimates the TA the UE 103 should use in order to obtain UL synchronization at the network node 101.

Step 2: RA Response (RAR)

The network node 101 sends a RA Response (RAR) comprising the TA, the Temporary Cell-Radio Network Temporary Identifier (TC-RNTI) to be used by the UE 103, a Random Access Preamble identifier that matches the transmitted PREAMBLE_INDEX and a grant for Msg3.

The UE 103 expects the RAR and thus, monitors PDCCH addressed to RA-RNTI to receive the RAR message from the network node 101 until the configured RAR window, e.g. a ra-ResponseWindow parameter, has expired or until the RAR has been successfully received.

From 3GPP TS 38.321 V15.5.0 (2019-03): "The MAC entity may stop ra-ResponseWindow (and hence monitoring for Random Access Response(s)) after successful reception of a Random Access Response containing Random Access Preamble identifiers that matches the transmitted PREAMBLE_INDEX".

Step 3: Msg3—UE ID or UE-specific C-RNTI

In Message 3 (Msg3) the UE 103 transmits its identifier, e.g. UE ID, for initial access or—if it is already in RRC_CONNECTED or RRC_INACTIVE mode and needs to e.g. resync, its UE-specific RNTI. If the network node 101 may not decode Msg3 at the granted UL resources, it may send Downlink Control Information (DCI) addressed to TC-RNTI for retransmission of Msg3. HARQ retransmission is requested until the UEs 103 restart the RA procedure from step 1 after reaching the maximum number of Hybrid automatic repeat request (HARQ) retransmissions or until Msg3 may be successfully received by the network node 101.

Step 4: Msg4—Contention Resolution

In Message 4 (Msg4), the network node 101 responds by acknowledging the UE ID or C-RNTI. The Msg4 gives contention resolution, i.e. only one UE ID or C-RNTI may be sent even if several UEs have used the same preamble, and the same grant for Msg3 transmission, simultaneously.

For Msg4 reception, the UE 103 monitors TC-RNTI, if it transmitted its UE ID in Msg3, or C-RNTI, if it transmitted its C-RNTI in Msg3.

In LTE, the 4-step RA may not be completed in less than 14 ms/TTI/SF. TTI is short for Time Transmission Interval and SF is short for Sub Frame.

2-Step Random Access

The 2-step RA gives much shorter latency than the ordinary 4-step RA. In the 2-step RA, the preamble and a message corresponding to Msg3, denoted msgA, in the 4-step RA are transmitted in the same or in two subsequent slots. The msgA PUSCH part (corresponding to msg3 in 4-step RA) is sent on a resource dedicated to the specific preamble. This means that both the preamble and the msgA PUSCH part face contention but contention resolution in this case means that either both preamble and Msg 3 are sent without collision or both collide.

The 2-step RA procedure is depicted in FIG. 2. The method exemplified in FIG. 2 comprises at least one of the following steps, which steps may be performed in any suitable order than described below:

Step 201

The UE 103 sends a preamble to the network node 101. The network node 101 receives the RA preamble from the UE 103. The preamble may be a RA preamble.

Step 202

The UE 103 sends msgA PUSH to the network node 101. The network node 101 receives msgA PUSH from the UE 103.

Step 201 and 202 may be seen as one message referred to as e.g. msgA.

Step 203

The network node 101 sends msgB to the UE 103. msgB may comprise at least one of TA, C-RNTI and CR-id. The UE 103 receives msgB from the network node 101.

Upon successful reception of msgA, the network node 101 will respond with a TA, which by assumption should not be needed or just give very minor updates, and an Msg4 for contention resolution.

An issue that may occur if the UE TA is bad, e.g. using TA=0 in a large cell or using an old TA even though the UE 103 has moved, is that only the preamble may be detected by the network node 101. This may be because a transmission with an inaccurate TA value may interfere with transmissions from other UEs in the same cell. Additionally, the preamble signal has higher detection probability than the normal data due to its design pattern. In this case, the network node 101 may reply with an ordinary RAR giving the UE 103 an opportunity to transmit an ordinary Msg3 on a scheduled resource. This is a fallback to 4-step RA.

Wideband Operation in NR-U

As in NR licensed, it is expected that NR-U may support transmission over a wide bandwidth (>>20 MHz). It is expected that this may be achieved in two different ways: (1) carrier aggregation with configuration of multiple serving cells, e.g., each with 20 MHz bandwidth, and (2) configuration of a single wideband serving cell with bandwidth as an integer multiple of 20 MHz, e.g. 80 MHz.

The following objective is listed in the NR-U WID:

Wide band operation, in integer multiples of 20 MHz, for DL and UL for NR-U supported with multiple serving cells, and wideband operation, in integer multiples of 20 MHz, for DL and UL for NR-U supported with one serving cell with bandwidth >20 MHz with potential scheduling constraints on feasibility of operating the wideband carrier when LBT is unsuccessful in one or more LBT sub bands within the wideband carrier. For all wideband operation cases, CCA is performed in units of 20 MHz, at least for 5 GHz. A LBT sub band may also be referred to as a frequency sub band or subcarrier band.

In both scenarios, CCA is performed in units of 20 MHz, at least for 5 GHz. Two modes according to relationship between the carrier bandwidth (CBW) and the LBT bandwidth (LBW) may be defined:

Mode 1

Mode 2

In Mode 1, multiple carriers are aggregated, and for each carrier the relationship is that CBW=LBT. CBW may be short for Carrier Bandwidth. For Mode 2, a single wideband carrier is used and the relationship is CBW>LBW. In Wideband Mode 2, the wideband carrier therefore comprises multiple LBT sub bands or multiple LBT bandwidths.

This terminology may be applied generically for both the 5 and 6 GHz bands. For the 5 GHz band, LBW=20 MHz. However, for the 6 GHz band, the LBW is still under discussions. It may be possible that the basic channelization is based on a larger unit than 20 MHz, e.g., 80 MHz, in which case the LBW would be 80 MHz as well.

Band-Width Parts (BWP)

For NR, 3GPP has standardized the use of Band Width Parts (BWPs). The reasons for using BWPs are that some UEs might not be able to use the entire BW, in which case they are assigned a smaller BWP, which they are capable of handling. Another reason is for battery savings. A UE 103 may be assigned a narrower BWP to reduce the needed energy for reception and transmission. Yet another reason may be for load balancing when the UEs 103 does not need the entire BW to meet the bit rate requirements.

According to TS 38.321 V 15.6.0, section 4.4.5, a carrier bandwidth part is defined as follows: "Carrier Bandwidth Part is a contiguous set of physical resource blocks, selected from a contiguous subset of the common resource blocks for a given numerology(u) on a given carrier."

It has been agreed that each UE 103 is assigned with at least an initial BWP, the same for all UEs, narrow enough for all UEs 103 to handle, and a default BWP. The default BWP may be the same as the initial BWP but may also be different, i.e. different UEs 103 may have different default BWPs. In addition to initial and default BWP, the UE 103 may be configured with additional BWPs. It has been agreed that a UE 103 may have up to four DL/UL BWPs. An important agreement is also that at any point in time, only one BWP is active for a specific UE 103.

A BWP may also be configured with PRACH occasions, allowing the UE 103 to initiate a Random Access procedure on the BWP. The configuration of PRACH occasions on a BWP is not mandatory except on the initial BWP, where it is always present to allow initial access. Also for PUCCH, a BWP may or may not have PUCCH resources configured. The reason for not having a PUCCH configured is that it occupies resources, which may lead to overhead, especially in configured but not active BWPs. When a UE 103 initiates a RA procedure, it must first ensure that the active BWP contains PRACH occasions and that the DL BWP has the same BWP-ID as the active UL BWP. This is specified in 3GPP TS 38.321 V15.5.0 (2019-03) in Section 5.15.

An example of a possible BWP and PRACH configuration on a wide carrier with 20 MHz LBT-sub bands according to legacy is shown in FIG. 3.

In FIG. 3, three BWPs are shown: an initial BWP 301, a first non-initial BWP 303 and second non-initial BWP 305. The initial BWP 301 has PRACH resources and may be used for initial access. Both the overlapping BWP1 303 and BWP2 305 have PRACH resources in the overlapping sub band. The overlapping may be seen by the overlapping bracket in FIG. 3. This may be used in connected mode if the UE 103 has either BWP1 or BWP2 as active BWP. FIG. 3 also shows the wideband carrier, which comprises the initial BWP 301, the first non-initial BWP 303 and the second non-initial BWP 305. The LBT sub band may be of a size of 20 MHz.

SUMMARY

With support of multiple Listen-Before-Talk (LBT) sub bands within a Band-Width Part (BWP), benefits of providing additional transmission opportunities for a UE operating in NR-unlicensed spectrum (NR-U UE) to mitigate the negative impact imposed by LBT operations may be achieved.

One question may be how to provide Physical Random Access Channel (PRACH) configuration across different LBT sub bands within a BWP. In the NR Rel-15, the time domain locations for PRACH resources are configured by the parameter prach-ConfigurationIndex, while the frequency domain locations for Random Access (RA) preambles are configured by the parameter msg1-FrequencyStart and the parameter msg1-FDM. The three parameters are carried by the RRC IE RACH-ConfigGeneric, which is further carried by the IE RACH-ConfigCommon in the IE BWP-UplinkCommon. In this way, the PRACH resources are configured per BWP. Thus, the existing PRACH configuration framework is not sufficient to support multiple LBT sub bands.

For RA triggered in RRC Connected or RRC Inactive states, there are two options to configure PRACH resources across different LBT sub bands:

Option 1: PRACH configuration per LBT sub band

Option 2: A single PRACH configuration across LBT sub band

Option 1 is not preferred since it would bring substantial work for the RRC spec, since the PRACH configuration is configured per BWP in the existing NR spec. Introduction of the LBT sub band would mean that RAN2 has to change the container structure for the PRACH configuration, leading to much effort which makes it difficult to be completed within the Rel-16 time scope.

Instead, the Option 2 is more preferred since it may require small efforts for RAN2 to change the spec. In the NR Rel-15, the time domain locations for PRACH resources are configured by the parameter prach-ConfigurationIndex, while the frequency domain locations for RA preambles are configured by the parameter msg1-FrequencyStart and the parameter msg1-FDM. The three parameters are carried by the RRC IE RACH-ConfigGeneric, which is further carried by the IE RACH-ConfigCommon in the IE BWP-Uplink-Common. In this way, the PRACH resources are configured per BWP. The RACH Occasions (ROs) in the frequency domain are placed consecutively starting from the frequency position specified by the parameter msg1-FrequencyStart. Depending on the setting of this offset, ROs in frequency domain may be configured across at maximum two LBT sub bands. Thus, the existing PRACH configuration framework is not sufficient to configure PRACH ROs across all LBT sub bands.

PRACH may be described as a channel being used by the UE to request an uplink allocation from the network node.

Thus, it is necessary to enhance the existing PRACH configuration framework to allow ROs are distributed equally among all LBT sub bands per BWP.

Therefore, there is a need to at least mitigate or solve these issues. An objective of embodiments herein is therefore to obviate at least one of the above disadvantages and to improve handling of PRACH configurations, e.g. to improve configuration of PRACH occasions.

According to a first aspect of the present disclosure, the object is achieved by a method, performed by a User Equipment (UE) in a communications system. The method comprises obtaining a PRACH configuration, wherein the PRACH configuration indicates that the PRACH comprises at least one offset. The method further comprises applying the PRACH configuration.

In some embodiments, the at least one offset is located between two consecutive Random Access Channel (RACH) Occasions (ROs) in frequency domain. The ROs in the frequency domain may be distributed across different Listen-Before-Talk (LBT) bandwidth segments in the PRACH configuration.

In some embodiments, the at least one offset is an msg1-ROFrequencyOffset defined for a RACH-ConfigGeneric.

In some embodiments, the at least one offset takes a value in a range between 0 and a maximum number of Physical Resource Blocks (PRB) minus 1.

In some embodiments, the at least one offset covers a bandwidth of a guard band between ROs in the PRACH configuration.

In some embodiments, the PRACH configuration comprises a location parameter. The location parameter indicates a location of the at least one offset in the PRACH configuration. The location parameter may be an msg1-FDM-per-sub band parameter. For example, the location parameter may be present when more than two ROs are configured in the frequency domain.

In some embodiments, the step of obtaining the PRACH configuration comprises determining the PRACH configuration or receiving the PRACH configuration from a network node directly or via some other node or memory unit.

In some embodiments, the step of applying the PRACH configuration comprises initiating a Random Access (RA) procedure according to the obtained PRACH configuration.

In some embodiments, the UE is configured with multiple serving cells or carriers within a same timing advance group.

According to a second aspect of the present disclosure, the object is achieved by a method, performed by a network node in a communications system. The method comprises providing a PRACH configuration to a UE. The PRACH configuration indicates that the PRACH comprises at least one offset.

In some embodiments, the method further comprises determining the PRACH configuration.

In some embodiments, the at least one offset is located between two consecutive ROs in frequency domain. The ROs in the frequency domain may be distributed across different LBT bandwidth segments in the PRACH configuration. For example, the at least one offset may be an msg1-ROFrequencyOffset defined for a RACH-ConfigGeneric.

In some embodiments, the at least one offset takes a value in a range between 0 and a maximum number of Physical Resource Blocks, PRBs, minus 1.

In some embodiments, the at least one offset covers a bandwidth of a guard band between ROs in the PRACH configuration.

In some embodiments, the PRACH configuration comprises a location parameter. The location parameter indicates a location of the at least one offset in the PRACH configuration. The location parameter may be an msg1-FDM-per-sub band parameter.

For example, the location parameter may be present when more than two ROs are configured in the frequency domain.

In some embodiments, the step of providing the PRACH configuration to the UE comprises providing the PRACH configuration to the UE directly or via some other node or memory unit.

In some embodiments, the method further comprises receiving, from the UE, a RA message initiating a RA procedure. The RA procedure is initiated according to the PRACH configuration.

According to a third aspect of the present disclosure, the object is achieved by a UE adapted, or configured, to perform a method according to any of the embodiments according to the first aspect.

The UE is adapted to obtain a PRACH configuration. The PRACH configuration indicates that the PRACH comprises at least one offset. The UE is further adapted to apply the PRACH configuration.

In some embodiments, the UE is adapted to obtain the PRACH configuration by determining the PRACH configuration or by receiving the PRACH configuration from a network node directly or via some other node or memory unit.

According to a fourth aspect of the present disclosure, the object is achieved by a network node adapted, or configured, to perform any of the embodiments according to the second aspect.

The network node is adapted to provide a PRACH configuration to a UE. The PRACH configuration indicates that the PRACH comprises at least one offset.

In some embodiments, the network node is further adapted to determine the PRACH configuration.

In some embodiments, the network node is further adapted to provide the PRACH configuration to the UE by providing the PRACH configuration to the UE directly or via some other node or memory unit.

In some embodiments, the network node is further adapted to receive, from the UE, a RA message initiating a RA procedure. The RA procedure is initiated according to the PRACH configuration.

According to a fifth aspect of the present disclosure, the object is achieved by a computer program comprising instructions which, when executed on at least one processor, cause the at least one processor to carry out the method according to any one of the first and the second aspect.

According to a sixth aspect of the present disclosure, the object is achieved by a carrier comprising the computer program of the fifth aspect, wherein the carrier is one of an electronic signal, an optical signal, an electromagnetic signal, a magnetic signal, an electric signal, a radio signal, a microwave signal, or a computer-readable storage medium.

Embodiments herein afford many advantages, of which a non-exhaustive list of examples follows:

An advantage of the embodiments herein is that they enable reduction of random access latency.

Another advantage of the embodiments herein is that unnecessary transmissions are minimized.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to configuring Physical Random Access Channel (PRACH) resources or occasions across different Listen-Before-Talk (LBT) sub bands. By introducing just one additional frequency domain offset between two consecutive RACH Occasions (ROs), ROs in frequency domain can be distributed across different LBT bandwidth segments, e.g. LBT sub bands or LBT carrier/cell. In this way, it is better guaranteed that the User Equipment (UE) can grasp at least one RO that has based LBT for every Random Access (RA) event.

PRACH occasion (RO) or RACH Occasion (RO) may be described as an area specified in time and frequency domain that are available for the reception of RACH preamble. Using other words, RO is a time-frequency resource on which the PRACH preamble is transmitted using the configured PRACH preamble format with a single transmit beam at a UE. RACH occasion may also be referred to as RACH transmission occasion. The abbreviation RO may be used for PRACH occasion and RACH occasion. PRACH occasion and RACH occasion is the same thing.

Figure 4:
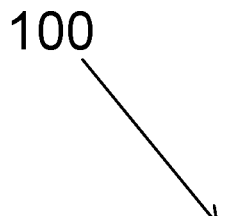
FIG. 4 is a schematic block diagram illustrating a communications system.
Figure 4:
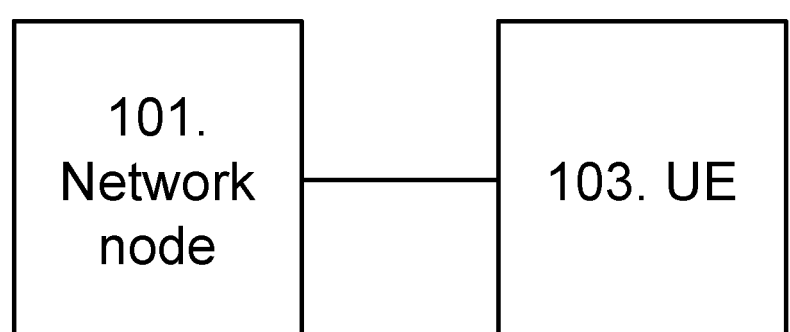

FIG. 4 depicts a non-limiting example of a communications system 100, which may be a wireless communications system, sometimes also referred to as a wireless communications network, cellular radio system, or cellular network, in which embodiments herein may be implemented. The communications system 100 may be a Fifth Generation (5G) system, 5G network, NR-U or Next Gen system or network. The communications system 100 may alternatively be a younger system than a 5G system. The communications system 100 may support other technologies such as, for example, Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, NB-IoT. Thus, although terminology from 5G/NR and LTE may be used in this disclosure to exemplify embodiments herein, this should not be seen as limiting the scope of the embodiments herein to only the aforementioned systems.

The communications system 100 comprises one or a plurality of network nodes, whereof the network node 101 is depicted in the non-limiting example of FIG. 4. The network node 101 may be a radio network node, such as a radio base station, or any other network node with similar features capable of serving a UE 103, such as a wireless device or a machine type communication device, in the communications system 100. The network node 101 may be an eNB, gNB, MeNB, RNC, NB, etc.

The communications system 100 may cover a geographical area, which may be divided into cell areas, wherein each cell area may be served by a network node, although, one network node may serve one or several cells. Note that any n number of cells may be comprised in the communications system 100, where n is any positive integer. A cell is a geographical area where radio coverage is provided by the network node at a network node site. Each cell is identified by an identity within the local network node area, which is broadcast in the cell. In FIG. 4, network node 101 may serve a cell. The network node 101 may be of different classes, such as, e.g., macro base station (BS), home BS or pico BS, based on transmission power and thereby also cell size. The network node 101 may be directly connected to one or more core networks, which are not depicted in FIG. 4 for the sake of simplicity. Thet network node 101 may be a distributed node, such as a virtual node in the cloud, and it may perform its functions entirely on the cloud, or partially, in collaboration with another network node.

One or a plurality of UEs 103 is located in the communication system 100. Only one UE 103 is exemplified in FIG. 4 for the sake of simplicity. A UE 103 may also be referred to simply as a device. The UE 103, e.g. a LTE UE or a 5G/NR UE, may be a wireless communication device which may also be known as e.g., a wireless device, a mobile terminal, wireless terminal and/or mobile station, a mobile telephone, cellular telephone, or laptop with wireless capability, just to mention some further examples. The UE 103 may be a device by which a subscriber may access services offered by an operator's network and services outside operator's network to which the operator's radio access network and core network provide access, e.g. access to the Internet. The UE 103 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device, Internet of Things (IOT) device, terminal device, communication device or any type of consumer electronic, for instance but not limited to television, radio, lighting arrangements, tablet computer, laptop or Personal Computer (PC). The UE 103 may be portable, pocket storable, hand held, computer comprised, or vehicle mounted devices, enabled to communicate voice and/or data, via the radio access network, with another entity, such as another UE, a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system.

The UE 103 is enabled to communicate wirelessly within the communications system 100. The communication may be performed e.g. between two devices, between a devices and a regular telephone, between the UE 103 and a network node, between network nodes, and/or between the devices and a server via the radio access network and possibly one or more core networks and possibly the internet.

The network node 101 may be configured to communicate in the communications system 100 with the UE 103 over a communication link, e.g., a radio link.

It should be noted that the communication links in the communications network may be of any suitable kind comprising either a wired or wireless link. The link may use any suitable protocol depending on type and level of layer, e.g. as indicated by the OSI model, as understood by the person skilled in the art.

When the text herein describes the network node 101 performs an action or method step, this may also be described as the network performs a certain action or method steps. In other words, the network may be represented by a network node 101 performing the action or method step described herein.

Figure 5:
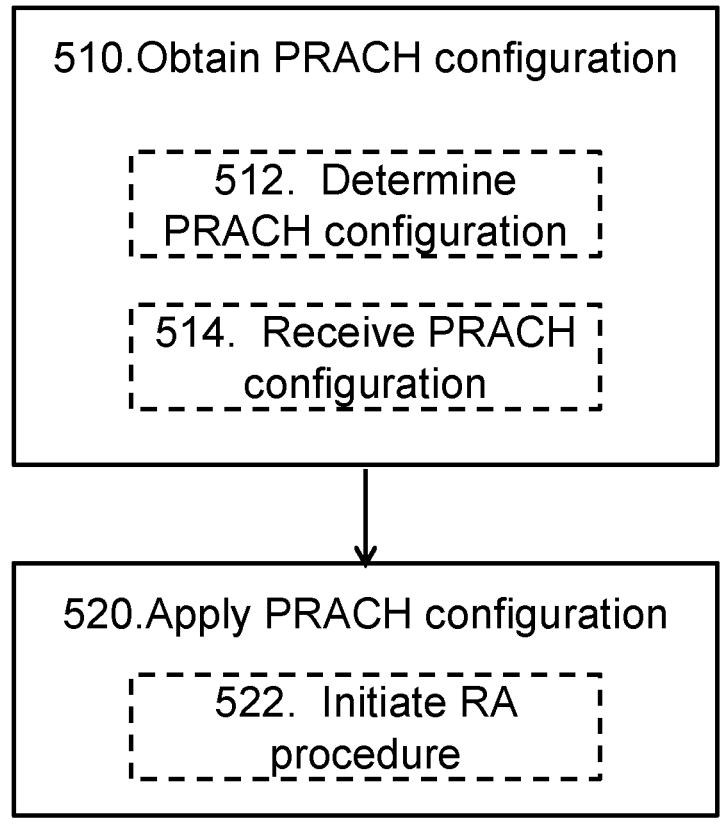
FIG. 5 is a flow chart illustrating a method.
Figure 7:
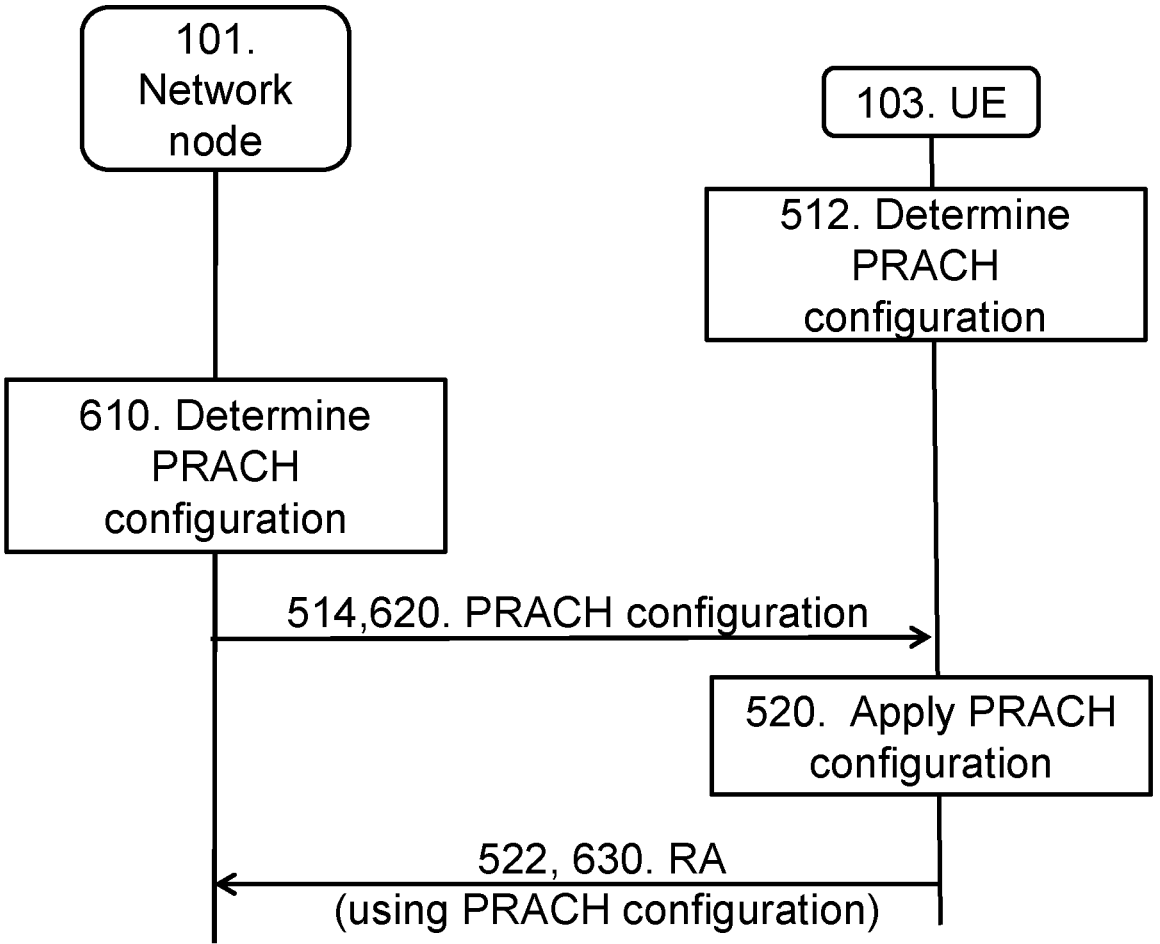
FIG. 7 is a signaling diagram according to embodiments herein.

The present disclosure is now going to be described with reference to FIG. 5 and FIG. 7. FIG. 5 is a flow chart illustrating a method 500 performed by the UE 103 and FIG. 7 illustrates a signaling diagram over the proposed method. The method 500 comprises at least one of the following steps, which steps may be performed in any suitable order than described below:

Step 510

The UE 103 obtains a PRACH configuration. The PRACH configuration indicates that the PRACH comprises at least one offset.

The PRACH configuration may indicate a setup of the PRACH, how the PRACH is organized, what parts it is composed of and how they are organized. The PRACH configuration may indicate that the PRACH comprises at least one offset and at least one of: one or multiple location parameters, one or multiple ROs, one or multiple guard bands etc.

A RO, a guard band and at least a part of an offset may be comprised in a LBT sub band.

A wideband carrier may comprise at least one of multiple ROs, multiple guard bands, multiple offsets etc. A wideband carrier may also be referred to as a BWP.

In one embodiment, the step 510 of obtaining the PRACH configuration may comprise step 512 of determining the PRACH configuration. In an alternative embodiment, the step 510 of obtaining the PRACH configuration may comprise step 514 of receiving the PRACH configuration from a network node 101, directly or via some other node or memory unit.

Step 520

The UE 103 applies the PRACH configuration.

In one embodiment, the step 520 of applying the PRACH configuration may comprise step 522 of initiating a RA procedure according to the obtained PRACH configuration. The UE 103 may provide a RA message to the network node 101. This may also be described as the UE 103 initiating a RA procedure. The RA message may be provided to the network node 101 using the PRACH configuration, i.e. the PRACH obtained in step 510.

Figure 6:
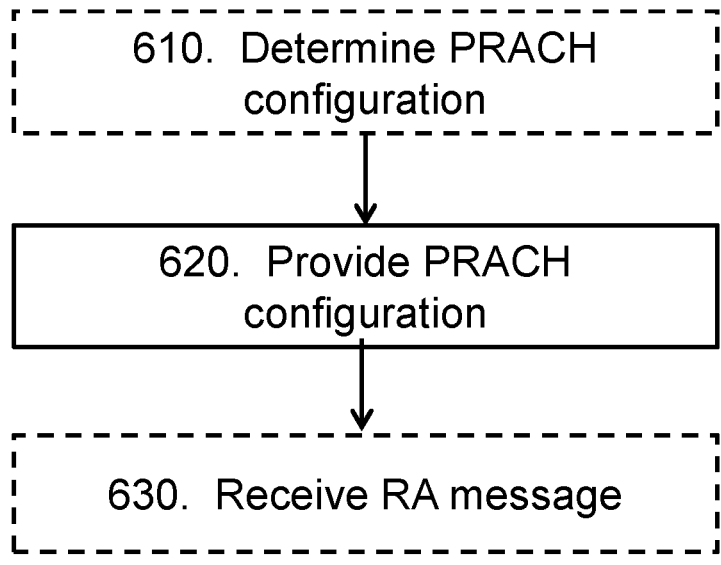
FIG. 6 is a flow chart illustrating a method.

The present disclosure is now going to be described with reference FIG. 6 and FIG. 7. FIG. 6 is a signaling diagram illustrating a method 600 performed by a network node 101 and FIG. 7 illustrates a signaling diagram over the proposed method. The method 600 comprises at least one of the following steps, which steps may be performed in any suitable order than described below:

Step 610

The network node 101 may determine a PRACH configuration. This may also be described as the network node 101 configures PRACH across different LBT sub bands.

Step 620

The network node 101 provides information indicating the PRACH configuration to the UE 103. The PRACH configuration indicates that the PRACH configuration comprises at least one offset. The information may be provided by transmitting the PRACH configuration directly to the UE 103, or by transmitting it via some other node to the UE 103, e.g. via another network node, memory unit etc. The information may be the actual PRACH configuration or it may be an address to a node from which the UE 103 may obtain the PRACH configuration. The UE 103 obtains the information indicating the PRACH configuration from the network node 101.

Step 630

The network node 101 may receive, from the UE 103, a RA message initiating a RA procedure. The RA procedure is initiated according to the PRACH configuration. The network node 101 obtains the RA message from the UE 103. This may also be described as the network node 101 detects that the UE 103 has initiated a RA procedure.

The embodiments are described herein in the context of NR unlicensed spectrum (NR-U), but they are not limited to NR-U scenarios. They are also applicable to other unlicensed operation scenarios such as LTE LAA/eLAA/fe-LAA/MulteFire. The embodiments herein are also applicable to licensed scenarios, so that ROs are placed in different frequency regions. This is expected to provide better diversity gain for the RACH performance.

In some embodiments, an additional offset may be located between two consecutive ROs in frequency domain. The ROs in the frequency domain may be distributed across different LBT bandwidth segments in the PRACH configuration. The at least one offset may be an msg1-ROFrequencyOffset defined for the RACH-ConfigGeneric. By properly adjusting the frequency offset between two ROs, ROs can be distributed in all LBT sub bands. This offset may take a value in a range between 0 and a maximum number of Physical Resource Blocks (PRBs) minus 1, i.e. maxNrof-PhysicalResourceBlocks−1. This offset is applied in case there are at least 2 ROs configured in the frequency domain (i.e., msg1-FDM=two).

In case more than two ROs are configured in the frequency domain, e.g. msg1-FDM=four, an additional parameter, to define where the offset is applied can be defined, named e.g. location parameter, msg1-FDM-per-sub band. Accordingly, in some embodiments, the PRACH configuration may comprise a location parameter, which indicates a location of the at least one offset in the PRACH configuration. If this is set to a higher value than one, the msg1-ROFrequencyOffset is applied per every msg1-FDM-per-sub band ROs. This means that RO's can be FDMed per sub band. For example, if msg1-FDM=eight and msg1-FDM-per-sub band=two, then msg1-ROFrequencyOffset is applied between RO 2 and 3, between RO 4 and 5 and between RO 6 and 7.

The offset may be as follows:
RACH-ConfigGeneric::=SEQUENCE {
prach-ConfigurationIndex INTEGER (0 . . . 255),
msg1-FDM ENUMERATED {one, two, four, eight},
msg1-FDM-per-sub band ENUMERATED {one, two, four},
msg1-FrequencyStart INTEGER (0 . . . maxNrofPhysi-calResourceBlocks−1),
msg1-ROFrequencyOffset INTEGER (0 . . . maxNrof-PhysicalResourceBlocks−1),
zeroCorrelationZoneConfig INTEGER (0 . . . 15),
preambleReceivedTargetPower INTEGER (−200 . . . −74),
preambleTransMax ENUMERATED {n3,n4,n5,n6,n7,n8, n10,n20,n50,n100,n200},
powerRampingStep ENUMERATED {dB0, dB2, dB4, dB6},
ra-ResponseWindow ENUMERATED {s1, s12, s14, s18, s110, s120, s140, s180}

At every RACH time position, there may be multiple ROs distributed across different LBT sub bands, whenever a RA event is triggered at a time occasion, the UE 103 can perform multiple LBT operations in parallel, and each of them is carried out on a separate LBT sub bands, based on the outcome of LBT operations, the UE can select just one RO in a LBT sub band which has passed the LBT.

Figure 8:
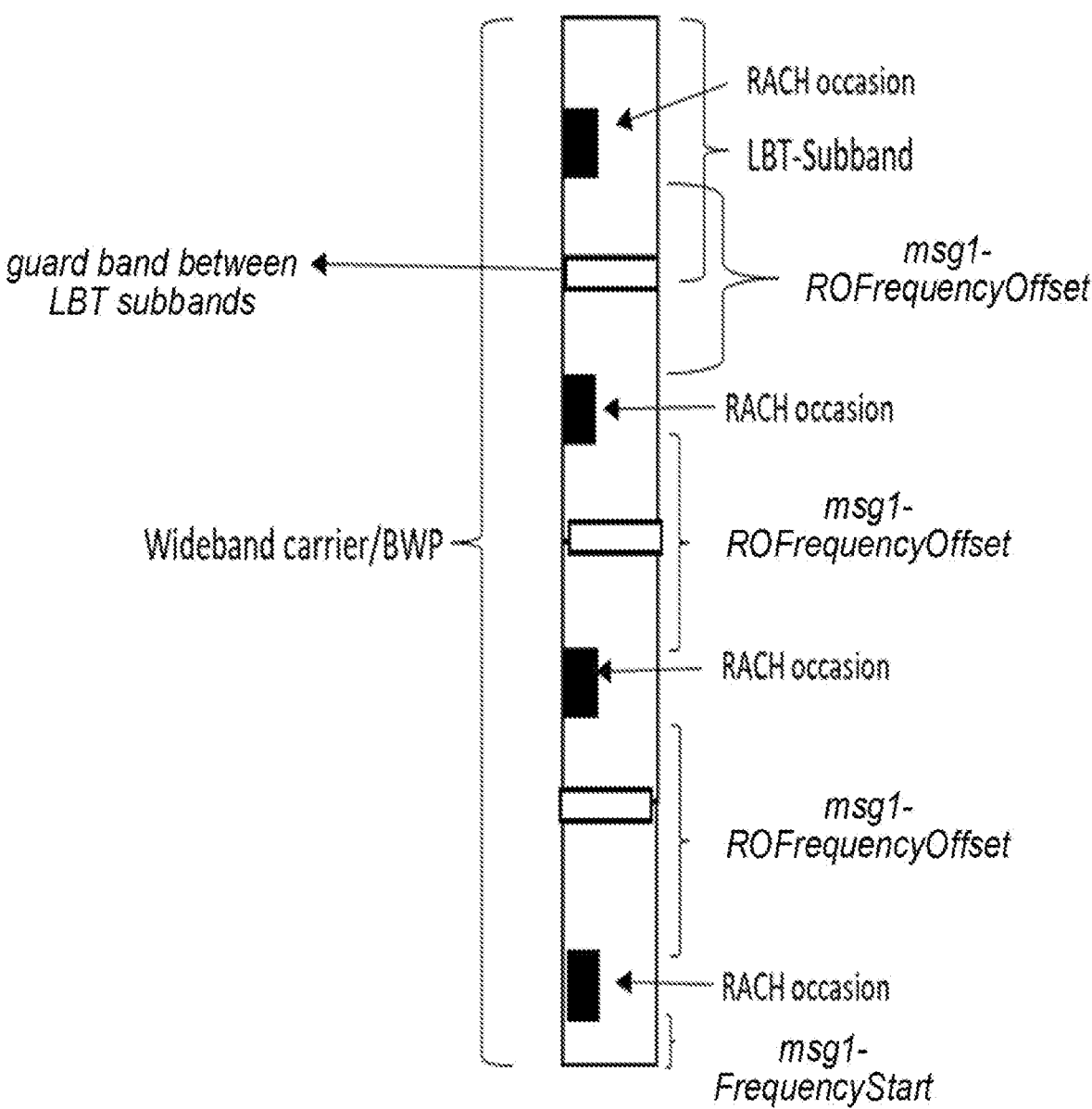
FIG. 8 illustrates additional offset between ROs, where ROs can be configured across multiple LBT sub bands, the offset covers the bandwidth of the guard band between ROs.

The value range of the new offset may cover the bandwidth size of the guard band between two LBT sub bands/channels, i.e., the number of PRBs and/or the number of OFDM symbols of the guard band is included in the setting of the offset. An example is shown in FIG. 8. Using other words, FIG. 8 illustrates that with an additional offset between ROs, ROs can be configured across multiple LBT sub bands. The at least one offset covers the bandwidth of the guard band between ROs in the PRACH configuration.

The value range of the offset may skip the bandwidth size of the guard band between two LBT sub bands/channels, i.e., the number of PRBs and/or the number of OFDM symbols of the guard band may be skipped in the setting of the offset. Accordingly, in some embodiments, the at least one offset does not cover the guard band. Using other words, the offset may be set without taking the value range into account.

In some embodiments, the UE 103 may be configured with multiple serving cells/carriers within a same timing advance group. Each serving cell or carrier in this group may contain just one LBT sub band/channel. The UE 103 may thus be configured with a common PRACH configuration across these cells/carriers. In order to provide more opportunities for a RACH procedure, the UE 103 may apply the similar mechanism to distribute ROs in different cells/carriers. In this case, for every RA time occasion, the UE 103 may then have multiple ROs distributed in multiple cells/carriers, in case a RA event is triggered, the UE 103 may perform multiple LBT operations in multiple cells/carriers, based on outcome of the LBT operations the UE 103 may select just one cell/carrier which has passed the LBT to transmit the RA.

Figure 9A:
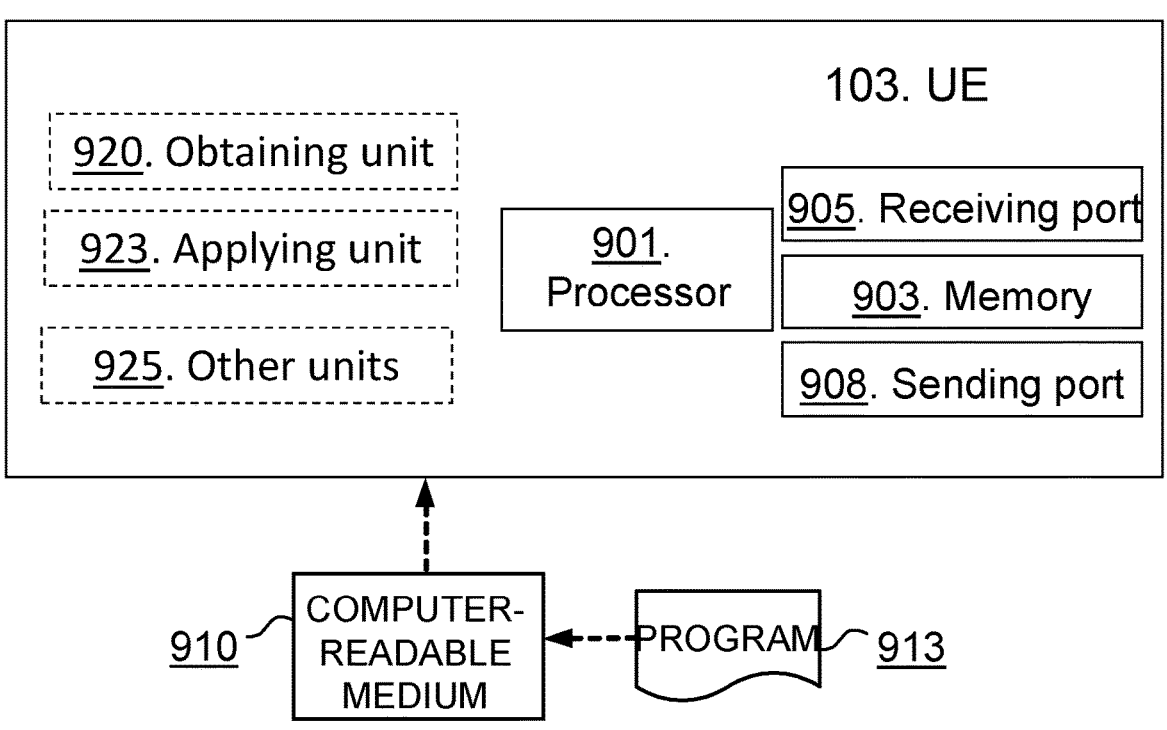
FIG. 9*a* is a schematic drawing illustrating an example of a UE.
Figure 9B:
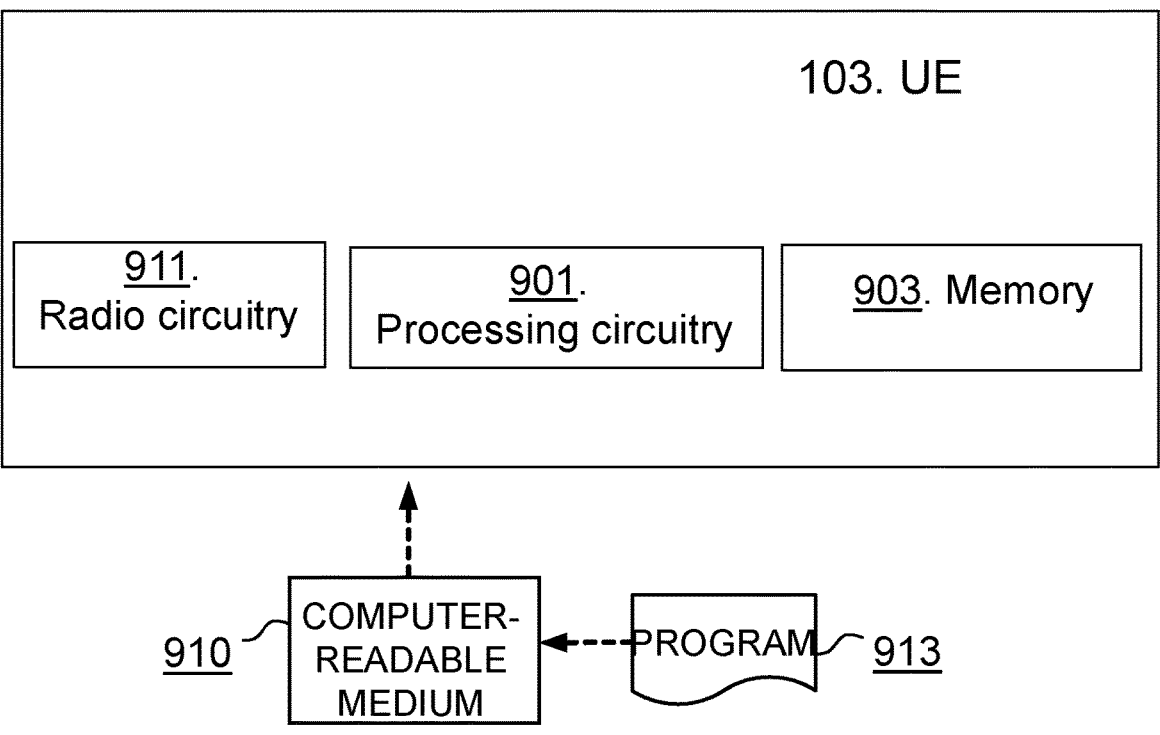
FIG. 9*b* is a schematic drawing illustrating an example of a UE.

FIG. 9*a* and FIG. 9*b* depict two different examples in panels a) and b), respectively, of the arrangement that the UE 103 may comprise. In some embodiments, the UE 103 may comprise the following arrangement depicted in FIG. 9*a*.

The embodiments herein in the UE 103 may be implemented through one or more processors, such as a processor 901 in the UE 103 depicted in FIG. 9*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the UE 103. One such carrier may be in the form of a CD ROM disc. It is however feasible with other data carriers such as a memory stick. The computer program code may furthermore be provided as pure program code on a server and downloaded to the UE 103.

The UE 103 may further comprise a memory 903 comprising one or more memory units. The memory 903 is arranged to be used to store obtained information, store data, configurations, schedulings, and applications etc. to perform the methods herein when being executed in the UE 103.

The UE 103 may receive information from, e.g. the network node 101, through a receiving port 905. In some embodiments, the receiving port 905 may be, for example, connected to one or more antennas in UE 103. In other embodiments, the UE 103 may receive information from another structure in the communications system 100 through the receiving port 905. Since the receiving port 905 may be in communication with the processor 901, the receiving port 905 may then send the received information to the processor 901. The receiving port 905 may also be configured to receive other information.

The processor 901 in the UE 103 may be further configured to transmit or send information to e.g. network node 101 or another structure in the communications system 100, through a sending port 908, which may be in communication with the processor 901, and the memory 903.

The UE 103 may comprise an obtaining unit 920, an applying unit 923, other units 925 etc.

Those skilled in the art will also appreciate that the obtaining unit 020, an applying unit 923, other units 925 described above may refer to a combination of analogue and digital circuits, and/or one or more processors configured with software and/or firmware, e.g., stored in memory, that, when executed by the one or more processors such as the processor 901, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The different units 920-925 described above may be implemented as one or more applications running on one or more processors such as the processor 901.

Thus, the methods according to the embodiments described herein for the UE 103 may be respectively implemented by means of a computer program 910 product, comprising instructions, i.e., software code portions, which, when executed on at least one processor 901, cause the at least one processor 901 to carry out the actions described herein, as performed by the UE 103. The computer program 910 product may be stored on a computer-readable storage medium 913. The computer-readable storage medium 913, having stored thereon the computer program 910, may comprise instructions which, when executed on at least one processor 901, cause the at least one processor 901 to carry out the actions described herein, as performed by the UE 103. In some embodiments, the computer-readable storage medium 913 may be a non-transitory computer-readable storage medium, such as a CD ROM disc, or a memory stick. In other embodiments, the computer program 910 product may be stored on a carrier containing the computer program 910 just described, wherein the carrier is one of an electronic signal, optical signal, radio signal, or the computer-readable storage medium 910, as described above.

The UE 103 may comprise a communication interface configured to facilitate communications between the UE 103 and other nodes or devices, e.g., the network node 101, or another structure. The interface may, for example, include a transceiver configured to transmit and receive radio signals over an air interface in accordance with a suitable standard.

The UE 103 may comprise the following arrangement depicted in FIG. 9b. The UE 103 may comprise a processing circuitry 901, e.g., one or more processors such as the processor 901, in the UE 103 and the memory 903. The UE 103 may also comprise a radio circuitry 911, which may comprise e.g., the receiving port 905 and the sending port 908. The processing circuitry 901 may be configured to, or operable to, perform the method actions according to FIG. 5, in a similar manner as that described in relation to FIG. 9a. The radio circuitry 911 may be configured to set up and maintain at least a wireless connection with the UE 103. Circuitry may be understood herein as a hardware component.

Hence, embodiments herein also relate to the UE 103 operative to operate in the communications system 100. The UE 103 may comprise the processing circuitry 901 and the memory 903, said memory 903 containing instructions executable by said processing circuitry 901, whereby the UE 103 is further operative to perform the actions described herein in relation to the UE 103, e.g., in FIG. 5.

Figure 10A:
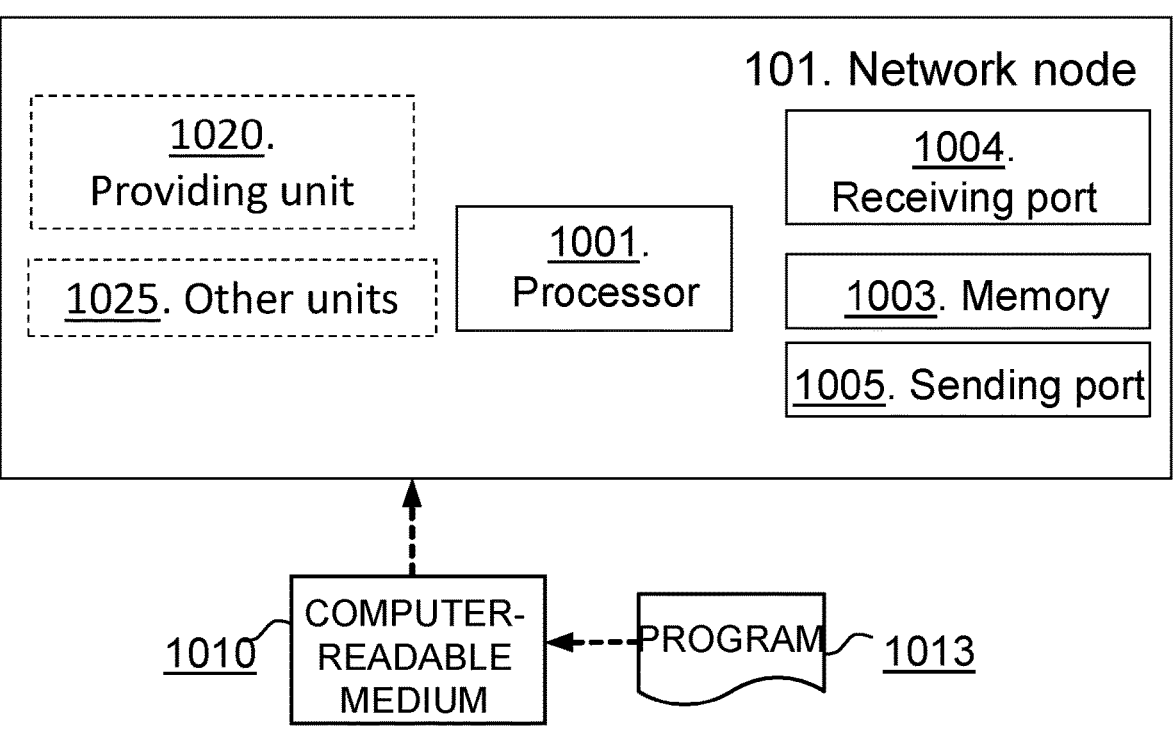
FIG. 10*a* is a schematic drawing illustrating an example of a network node.
Figure 10B:
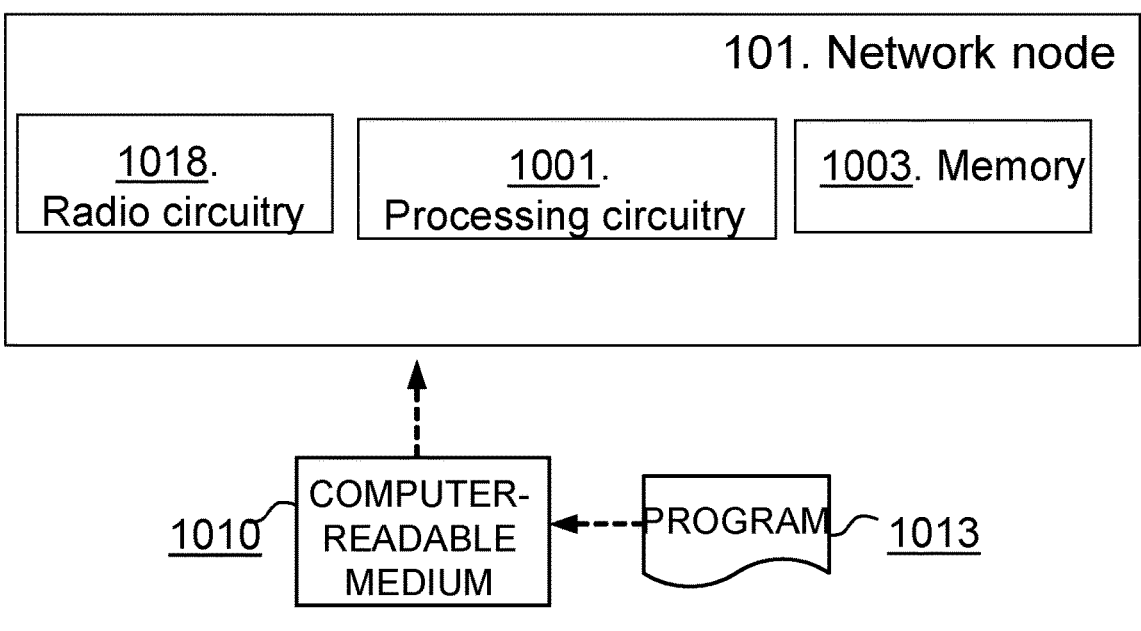
FIG. 10*b* is a schematic drawing illustrating an example of a network node.

FIG. 10a and FIG. 10b depict two different examples in panels a) and b), respectively, of the arrangement that the network node 101 may comprise. In some embodiments, the network node 101 may comprise the following arrangement depicted in FIG. 10a.

The embodiments herein in the network node 101 may be implemented through one or more processors, such as a processor 1001 in the network node 101 depicted in FIG. 10a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the network node 101. One such carrier may be in the form of a CD ROM disc. It is however feasible with other data carriers such as a memory stick. The computer program code may furthermore be provided as pure program code on a server and downloaded to the network node 101.

The network node 101 may further comprise a memory 1003 comprising one or more memory units. The memory 1003 is arranged to be used to store obtained information, store data, configurations, schedulings, and applications etc. to perform the methods herein when being executed in the network node 101.

The network node 101 may receive information from, e.g., the UE 103, through a receiving port 1004. The receiving port 1004 may be, for example, connected to one or more antennas in network node 101. The network node 101 may receive information from another structure in the communications system 100 through the receiving port 1004. Since the receiving port 1004 may be in communication with the processor 1001, the receiving port 1004 may then send the received information to the processor 1001. The receiving port 1004 may also be configured to receive other information.

The processor 1001 in the network node 101 may be further configured to transmit or send information to e.g., the UE 103, or another structure in the communications system 100, through a sending port 1005, which may be in communication with the processor 1001, and the memory 1003.

The network node 101 may comprise a providing unit 1020, other units 1025 etc.

Those skilled in the art will also appreciate that the providing unit 1020, other units 1025 etc. described above may refer to a combination of analogue and digital circuits, and/or one or more processors configured with software and/or firmware, e.g., stored in memory, that, when executed by the one or more processors such as the processor 1001, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1020-1025 described above may be implemented as one or more applications running on one or more processors such as the processor 1001.

Thus, the methods described herein for the network node 101 may be respectively implemented by means of a computer program 1010 product, comprising instructions, i.e., software code portions, which, when executed on at least one processor 1001, cause the at least one processor 1001 to carry out the actions described herein, as performed by the network node 101. The computer program 1010 product may be stored on a computer-readable storage medium 1013. The computer-readable storage medium 1013, having stored thereon the computer program 1010, may comprise instructions which, when executed on at least one processor 1001, cause the at least one processor 1001 to carry out the actions described herein, as performed by the network node 105. In some embodiments, the computer-readable storage medium 1013 may be a non-transitory computer-readable storage medium, such as a CD ROM disc, or a memory stick. In other embodiments, the computer program 1010 product may be stored on a carrier containing the computer program 1010 just described, wherein the carrier is one of an electronic signal, optical signal, radio signal, or the second computer-readable storage medium 1013, as described above.

The network node 101 may comprise a communication interface configured to facilitate communications between the network node 101 and other nodes or devices, e.g., the UE 103, or another structure. The interface may, for example, include a transceiver configured to transmit and receive radio signals over an air interface in accordance with a suitable standard.

The network node 101 may comprise the following arrangement depicted in FIG. 10b. The network node 101 may comprise a processing circuitry 1001, e.g., one or more processors such as the processor 1001, in the network node 101 and the memory 1003. The network node 101 may also comprise a radio circuitry 1018, which may comprise e.g., the receiving port 1004 and the sending port 1005. The processing circuitry 1001 may be configured to, or operable to, perform the method actions according to FIG. 6 in a similar manner as that described in relation to FIG. 10a. The radio circuitry 1018 may be configured to set up and maintain at least a wireless connection with the network node 101. Circuitry may be understood herein as a hardware component.

The network node 101 may be operative to operate in the communications system 100. The network node 101 may comprise the processing circuitry 1001 and the memory 1003, said memory 1003 containing instructions executable by said processing circuitry 1001, whereby the network node 101 is further operative to perform the actions described herein in relation to the network node 101, e.g., in FIG. 6.

Further Extensions and Variations

Telecommunication network connected via an intermediate network to a host computer in accordance with some embodiments.

Figure 11:
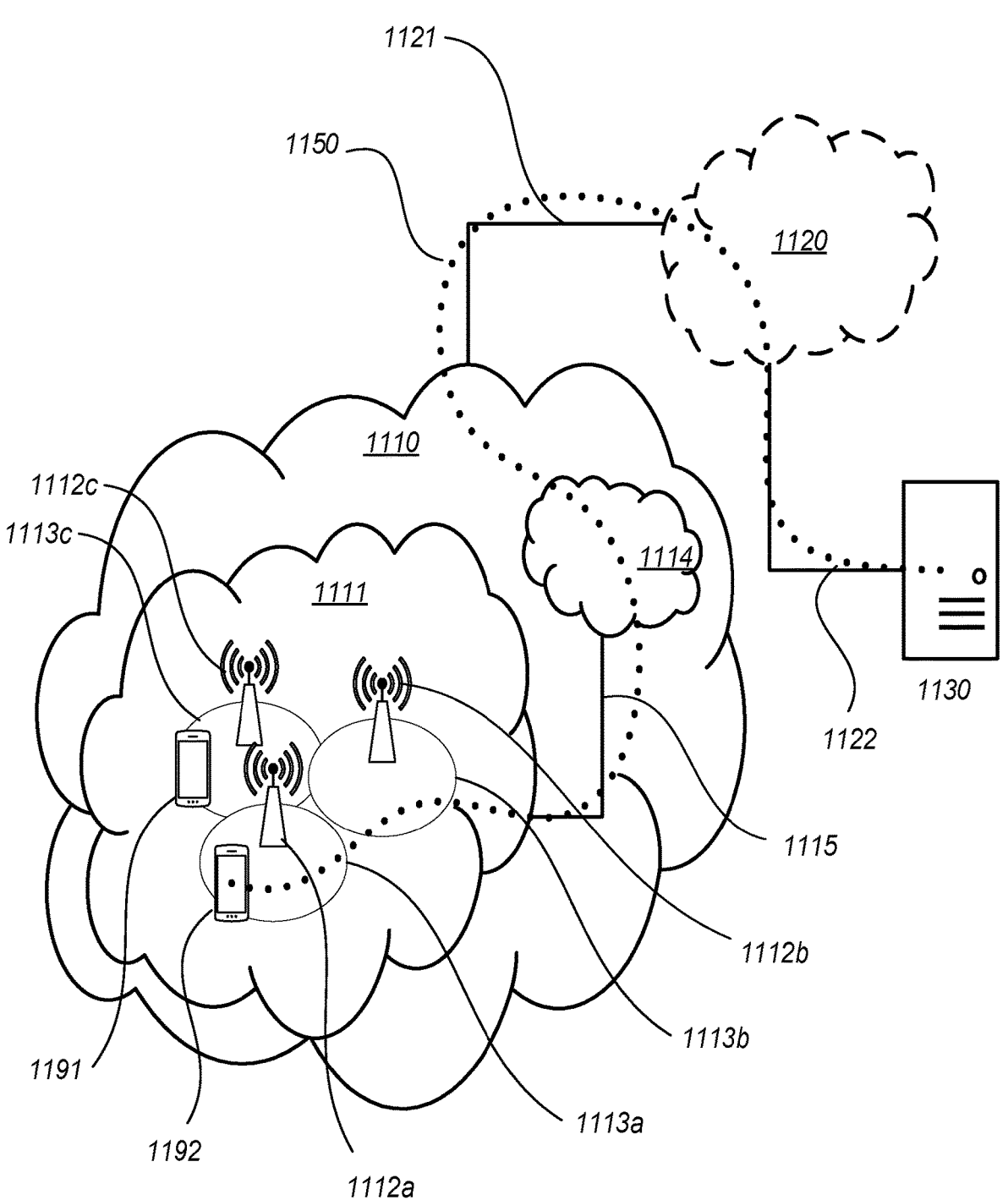
FIG. 11 is a schematic block diagram illustrating a telecommunication network connected via an intermediate network to a host computer.

With reference to FIG. 11, in accordance with an embodiment, a communication system includes telecommunication network 1110 such as the communications system 100, for example, a 3GPP-type cellular network, which comprises access network 1111, such as a radio access network, and core network 1114. Access network 1111 comprises a plurality of network nodes 105. For example, base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A plurality of UE's, such as the UE 103 may be comprised in the communications system 100. In FIG. 11, a first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112. Any of the UEs 1191, 1192 may be considered examples of the UE 103.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an Over-The-Top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

In relation to FIGS. 12-16 which are described next, it may be understood that the base station may be considered an example of the network node 101.

Figure 12:
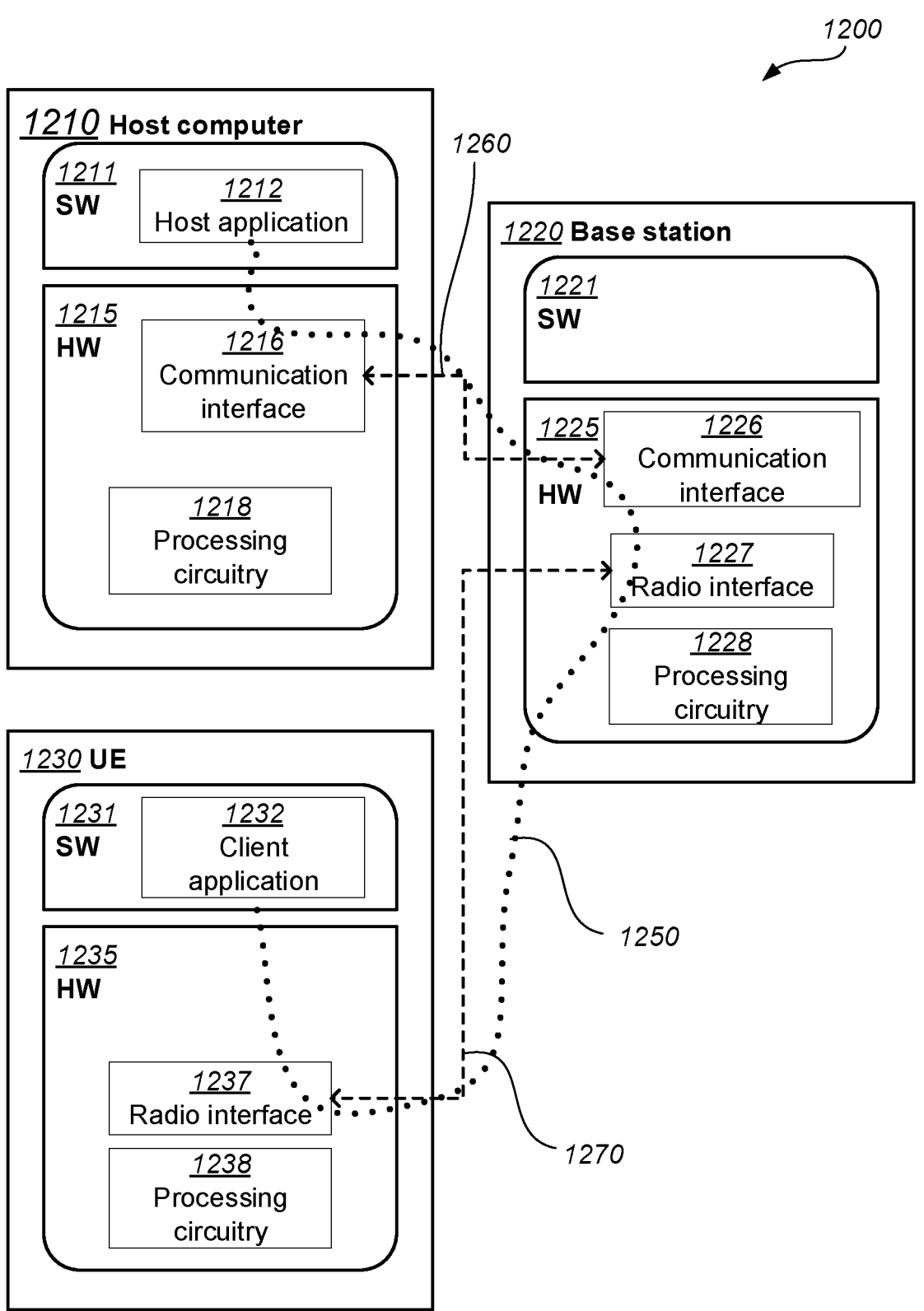
FIG. 12 is a schematic block diagram of a host computer communicating via a base station with a UE over a partially wireless connection.

FIG. 12 illustrates an example of host computer communicating via a network node 101 with a UE 103 over a partially wireless connection in accordance with some embodiments The UE 103 and the network node 101, e.g., a base station and host computer discussed in the preceding paragraphs will now be described with reference to FIG. 12. In communication system 1230, such as the communications system 100, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes the network node 101 exemplified in FIG. 12 as a base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with the UE 103, exemplified in FIG. 12 as a UE 1230 located in a coverage area served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

It is noted that host computer 1210, base station 1220 and UE 1230 illustrated in FIG. 12 may be similar or identical to host computer 1130, one of base stations 1112a, 1112b, 1112c and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the spectrum efficiency, and latency, and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figure 1:
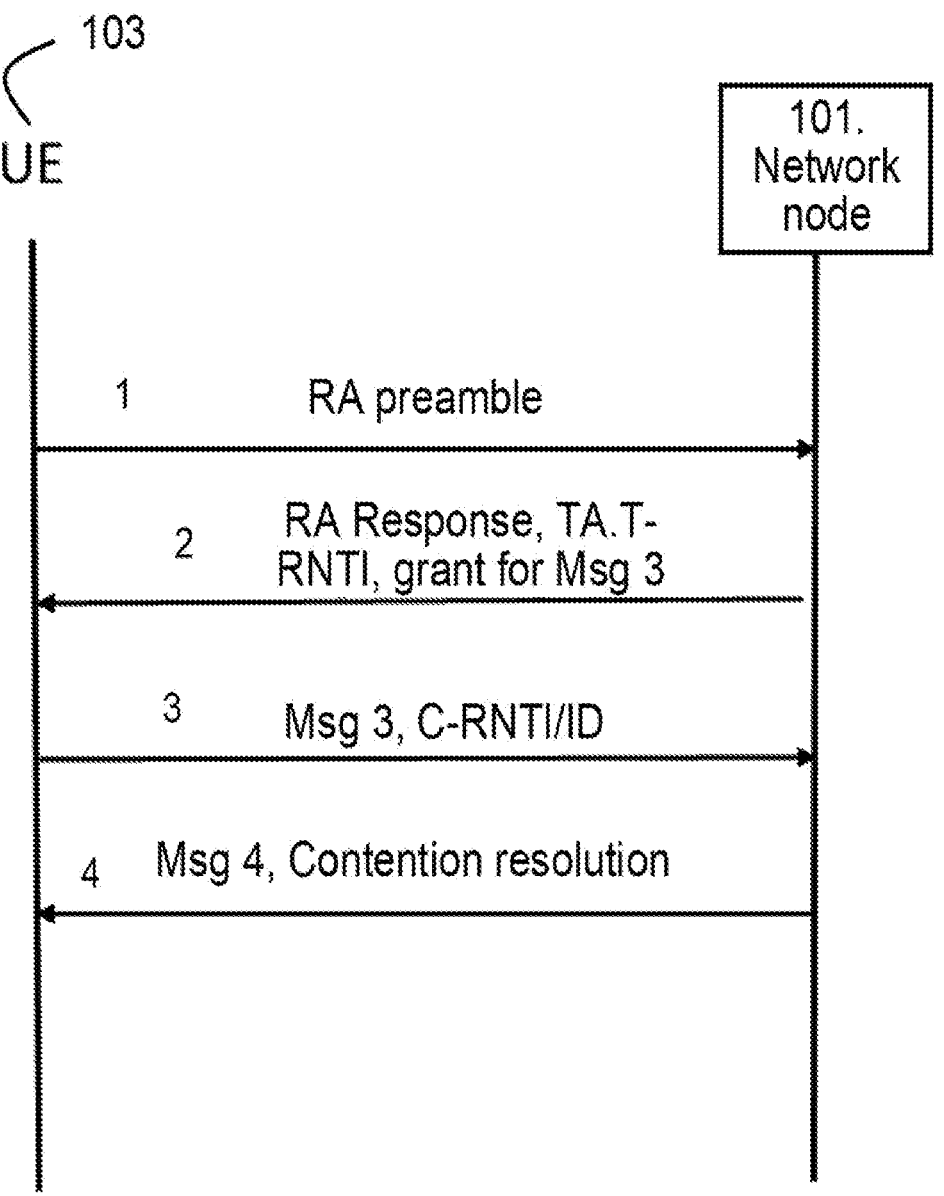
FIG. 1 is a flow chart illustrating a 4-Step RA procedure.
Figure 2:
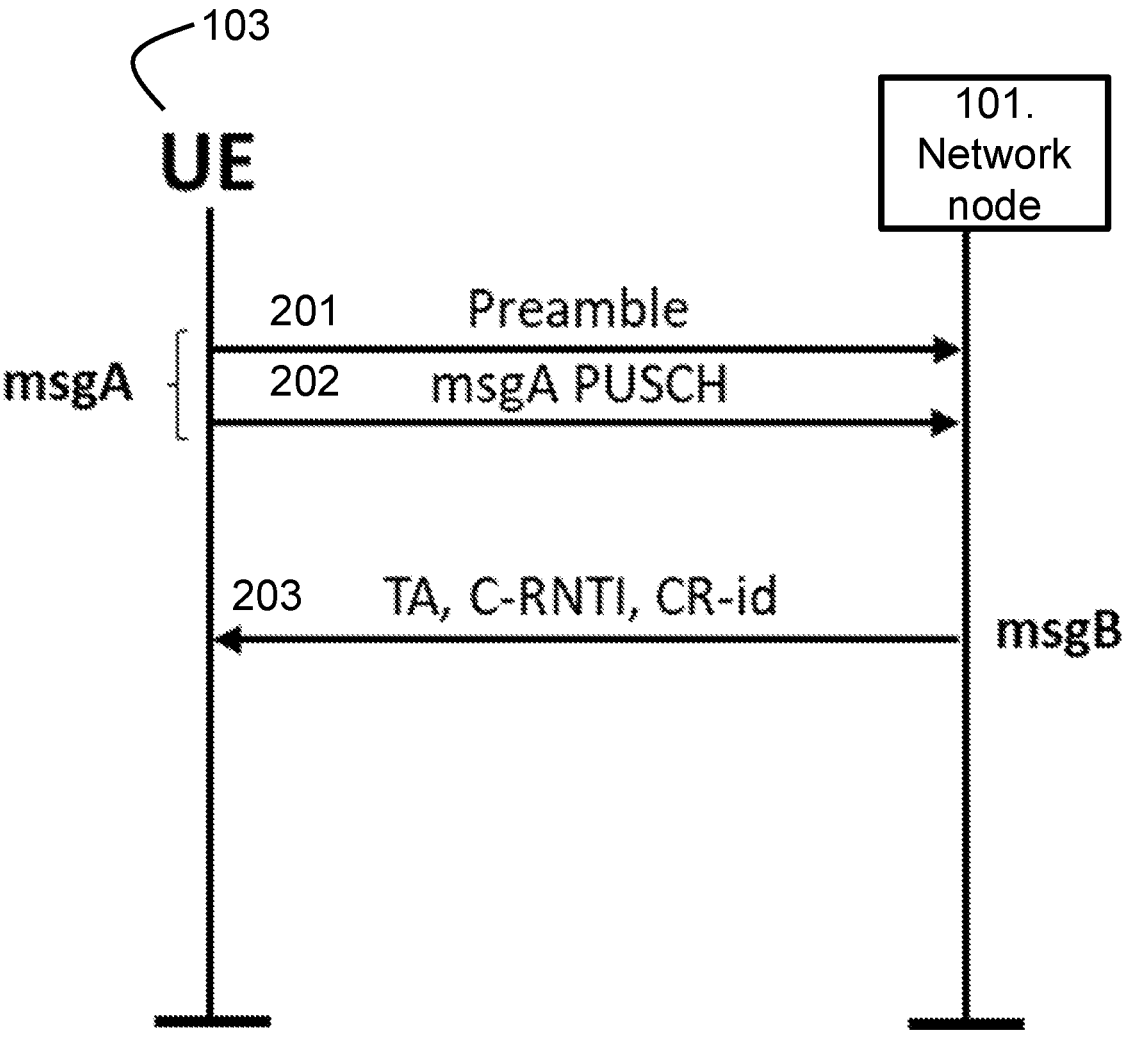
FIG. 2 is a flow chart illustrating a 2-step RA procedure.
Figure 3:
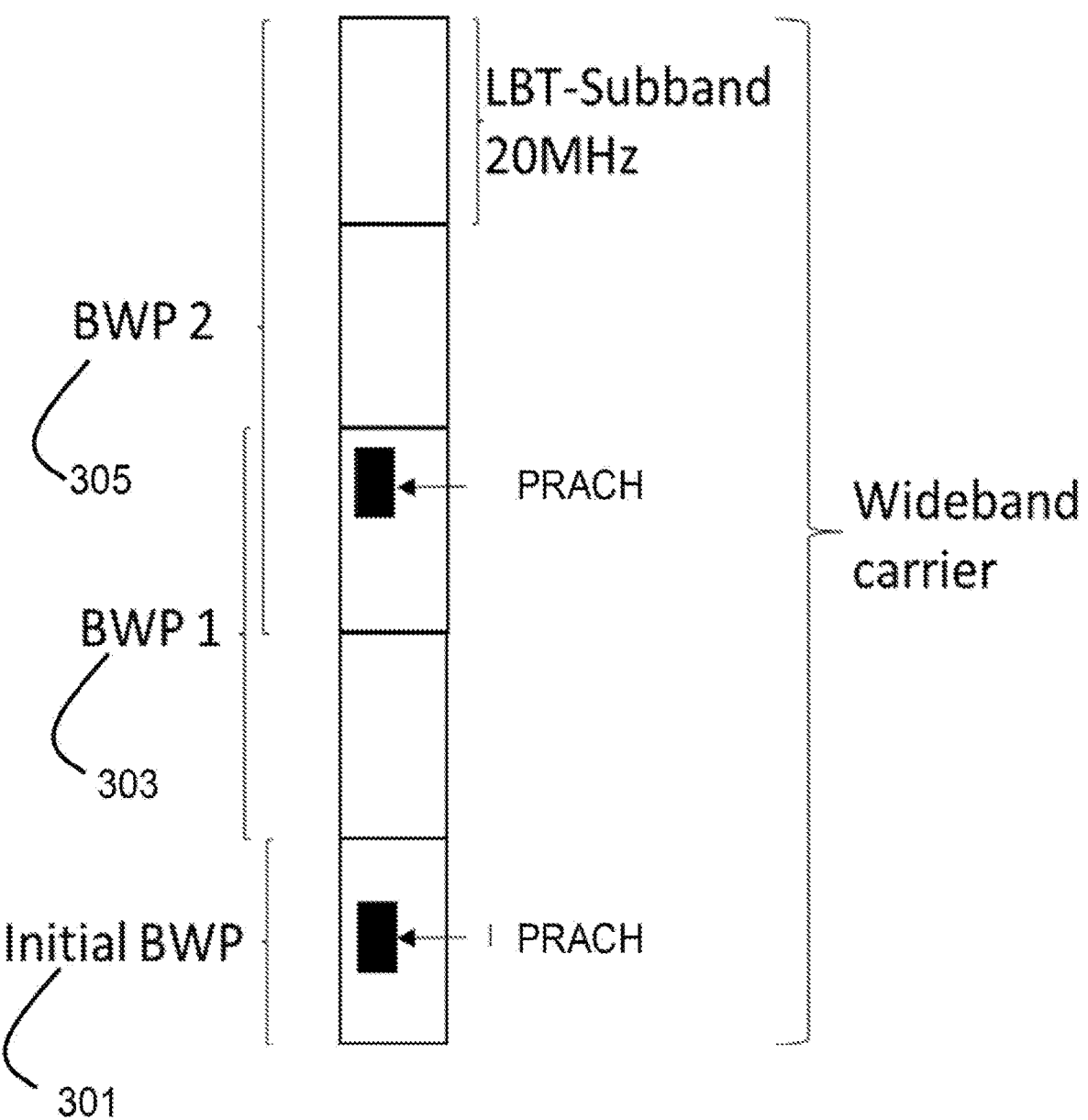
FIG. 3 illustrates a possible BWP and PRACH configuration on a wide carrier with 20 MHz LBT-sub bands according to legacy methods.
Figures 13, 14:
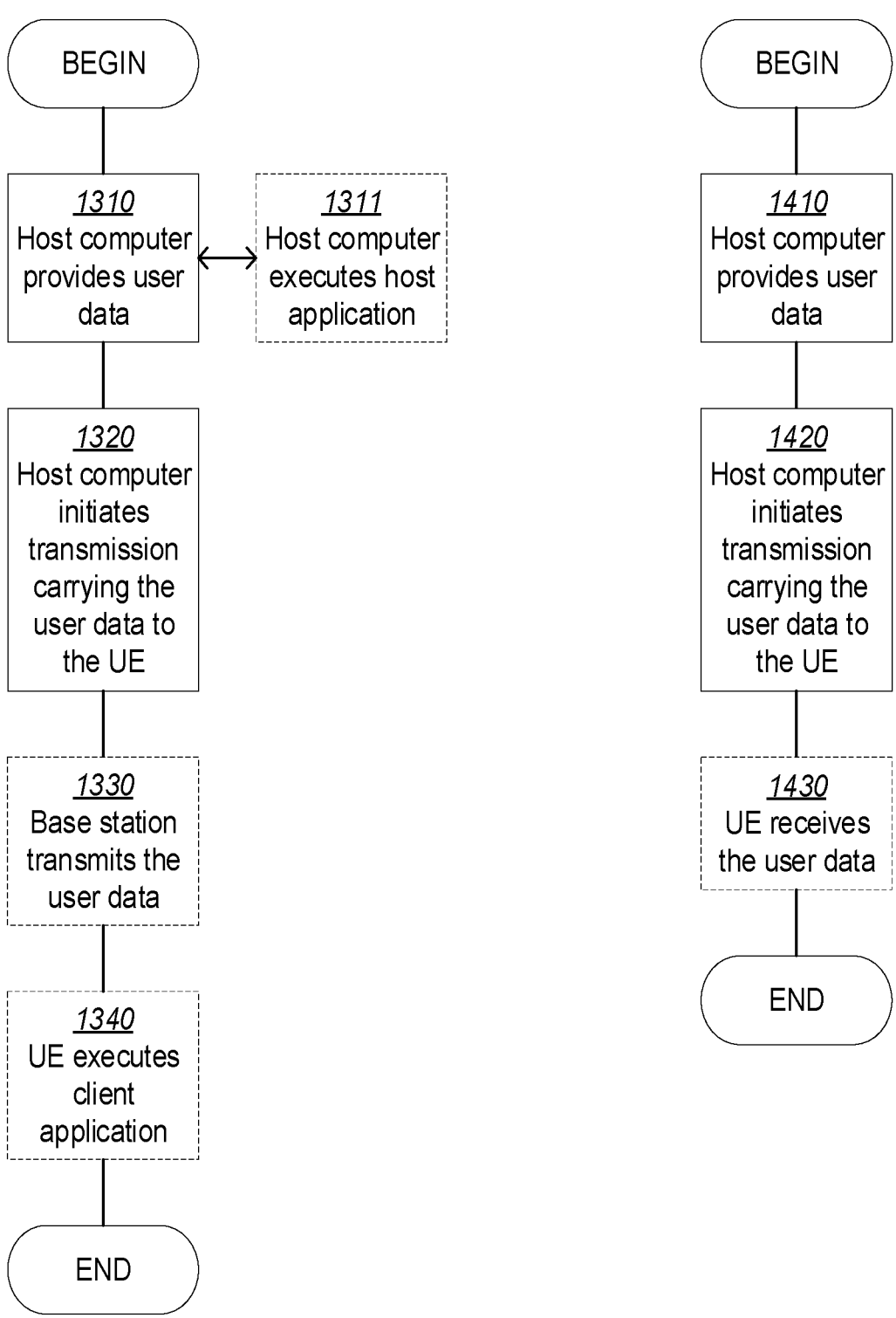
FIG. 13 is a flowchart depicting embodiments of a method in a communications system including a host computer, a base station and a UE.
FIG. 14 is a flowchart depicting embodiments of a method in a communications system including a host computer, a base station and a UE.

FIG. 13 illustrates an example of methods implemented in a communication system including a host computer, a base station and a user equipment. FIG. 13 is a flowchart illustrating a method implemented in a communication system. The communication system includes a host computer, a base station and a UE which may be those described with reference to FIG. 11 and FIG. 2. For simplicity of the present disclosure, only drawing references to FIG. 13 will be included in this section. In step 1310, the host computer provides user data. In substep 1311 (which may be optional)

of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

FIG. 14 illustrates methods implemented in a communication system including a host computer, a base station and a user equipment in accordance with some embodiments. FIG. 14 is a flowchart illustrating a method implemented in a communication system. The communication system includes a host computer, a base station and a UE which may be those described with reference to FIG. 11 and FIG. 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figures 15, 16:
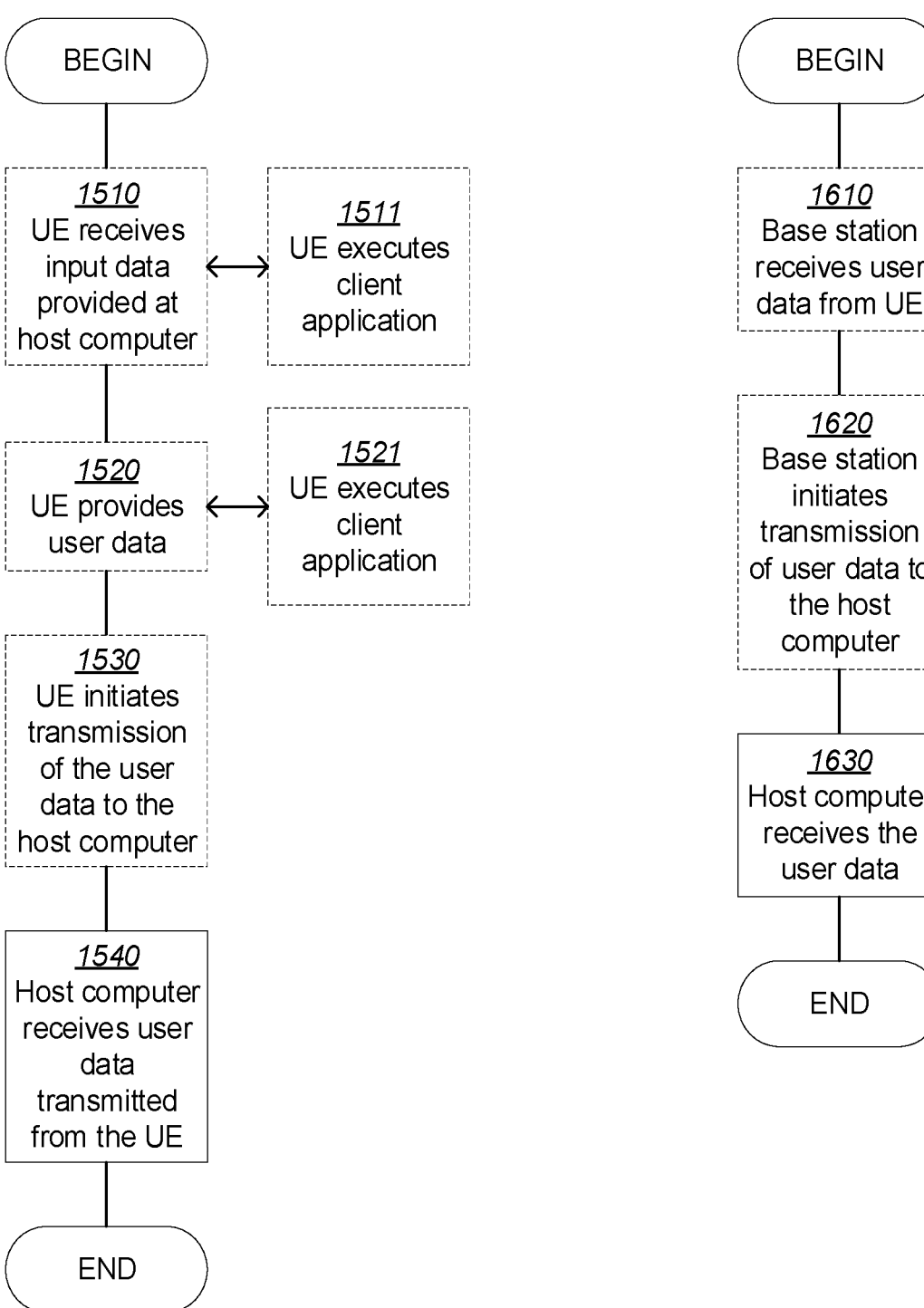
FIG. 15 is a flowchart depicting embodiments of a method in a communications system including a host computer, a base station and a UE.
FIG. 16 is a flowchart depicting embodiments of a method in a communications system including a host computer, a base station and a UE.

FIG. 15 illustrates methods implemented in a communication system including a host computer, a base station and a user equipment. FIG. 15 is a flowchart illustrating a method implemented in a communication system. The communication system includes a host computer, a network node 101 and a UE 103 which may be those described with reference to FIG. 11 and FIG. 12. For simplicity of the present disclosure, only drawing references to FIG. 15 will be included in this section. In step 15 (which may be optional), the UE 103 receives input data provided by the host computer. Additionally or alternatively, in step 1520, the UE 103 provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

FIG. 16 illustrates methods implemented in a communication system including a host computer, a base station and a user equipment. FIG. 16 is a flowchart illustrating a method implemented in a communication system. The communication system includes a host computer, a base station and a UE which may be those described with reference to FIG. 11 and FIG. 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Some embodiments may be summarized as follows:

A base station configured to communicate with a UE 103, the base station comprising a radio interface and processing circuitry configured to perform one or more of the actions described herein as performed by the network node 101.

A communication system 100 including a host computer comprising:

processing circuitry configured to provide user data; and a communication interface configured to forward the user data to a cellular network for transmission to a UE 103, wherein the cellular network comprises a network node 101 having a radio interface and processing circuitry, the base station's processing circuitry configured to perform one or more of the actions described herein as performed by the network node 101.

The communication system may further including the network node 101.

The communication system may further include the UE 103, wherein the UE 103 is configured to communicate with the network node 101.

The communication system, wherein:

the processing circuitry of the host computer is configured to execute a host application, thereby providing the user data; and the UE 103 comprises processing circuitry configured to execute a client application associated with the host application.

A method implemented in a network node 101, comprising one or more of the actions described herein as performed by the network node 101.

A method implemented in a communication system 100 including a host computer, a base station and a UE 103, the method comprising:

at the host computer, providing user data; and at the host computer, initiating a transmission carrying the user data to the UE 103 via a cellular network comprising the network node 101, wherein the network node 101 performs one or more of the actions described herein as performed by the network node 101.

The method may further comprise:

at the network node 101, transmitting the user data.

The user data may be provided at the host computer by executing a host application, and the method may further comprise:

at the UE 103, executing a client application associated with the host application.

A UE 103 configured to communicate with a network node 101, the UE 103 comprising a radio interface and processing circuitry configured to perform one or more of the actions described herein as performed by the UE 103.

A communication system 100 including a host computer comprising:

processing circuitry configured to provide user data; and a communication interface configured to forward user data to a cellular network for transmission to a UE 103, wherein the UE comprises a radio interface and processing circuitry, the UE's processing circuitry configured to perform one or more of the actions described herein as performed by the UE 103.

The communication system may further including the UE 103.

The communication system 100, wherein the cellular network further includes a network node 101 configured to communicate with the UE 103.

The communication system 100, wherein:

the processing circuitry of the host computer is configured to execute a host application, thereby providing the user data; and the UE's processing circuitry is configured to execute a client application associated with the host application.

A method implemented in a UE 103, comprising one or more of the actions described herein as performed by the UE 103.

A method implemented in a communication system 100 including a host computer, a network node 101 and a UE 103, the method comprising:

at the host computer, providing user data; and at the host computer, initiating a transmission carrying the user data to the UE 103 via a cellular network comprising the base station, wherein the UE 103 performs one or more of the actions described herein as performed by the UE 103.

The method may further comprise:

at the UE 103, receiving the user data from the network node 101.

A UE 103 configured to communicate with a network node 101, the UE 103 comprising a radio interface and processing circuitry configured to perform one or more of the actions described herein as performed by the UE 103.

A communication system 100 including a host computer comprising:

a communication interface configured to receive user data originating from a transmission from a UE 103 to a network node 101, wherein the UE 103 comprises a radio interface and processing circuitry, the UE's processing circuitry configured to: perform one or more of the actions described herein as performed by the UE 103.

The communication system 100 may further include the UE 103.

The communication system 100 may further include the network node 101, wherein the network node 101 comprises a radio interface configured to communicate with the UE 103 and a communication interface configured to forward to the host computer the user data carried by a transmission from the UE 103 to the base station.

The communication system 100, wherein:

the processing circuitry of the host computer is configured to execute a host application; and the UE's processing circuitry is configured to execute a client application associated with the host application, thereby providing the user data.

The communication system 100, wherein:

the processing circuitry of the host computer is configured to execute a host application, thereby providing request data; and the UE's processing circuitry is configured to execute a client application associated with the host application, thereby providing the user data in response to the request data.

A method implemented in a UE 103, comprising one or more of the actions described herein as performed by the UE 103.

The method may further comprise:

providing user data; and forwarding the user data to a host computer via the transmission to the network node 101.

A method implemented in a communication system 100 including a host computer, a network node 101 and a UE 103, the method comprising:

at the host computer, receiving user data transmitted to the network node 101 from the UE 103, wherein the UE 103 performs one or more of the actions described herein as performed by the UE 103.

The method may further comprise:

at the UE 103, providing the user data to the network node 101.

The method may further comprise:

at the UE 103, executing a client application, thereby providing the user data to be transmitted; and at the host computer, executing a host application associated with the client application.

The method may further comprise:

at the UE 103, executing a client application; and at the UE 103, receiving input data to the client application, the input data being provided at the host computer by executing a host application associated with the client application, wherein the user data to be transmitted is provided by the client application in response to the input data.

A network node 101 configured to communicate with a UE 103, the network node 101 comprising a radio interface and processing circuitry configured to perform one or more of the actions described herein as performed by the network node 101.

A communication system 100 including a host computer comprising a communication interface configured to receive user data originating from a transmission from a UE 103 to a base station, wherein the network node 101 comprises a radio interface and processing circuitry, the base station's processing circuitry configured to perform one or more of the actions described herein as performed by the network node 101.

The communication system 100 may further include the network node 101.

The communication system 100 may further include the UE 103, wherein the UE 103 is configured to communicate with the network node 101.

The communication system 100 wherein:

the processing circuitry of the host computer is configured to execute a host application;

the UE 103 is configured to execute a client application associated with the host application, thereby providing the user data to be received by the host computer.

A method implemented in a network node 101, comprising one or more of the actions described herein as performed by any of the network node 101.

A method implemented in a communication system including a host computer, a network node 101 and a UE 103, the method comprising:

at the host computer, receiving, from the network node 101, user data originating from a transmission which the base station has received from the UE 103, wherein the UE 103 performs one or more of the actions described herein as performed by the UE 103.

The method may further comprise:

at the network node 101, receiving the user data from the UE 103.

The method may further comprise:

at the network node 101, initiating a transmission of the received user data to the host computer.

Some embodiments may be summarized as follows:

A method performed by a User Equipment, UE, (103) in a communications system (100), the method comprising:

obtaining (501*a*, 502*b*) a Physical Random Access Channel, PRACH, configuration; and applying (502*a*, 503*b*) the PRACH configuration.

An offset may be located between two consecutive ROs in the PRACH configuration, the offset may be e.g. a frequency domain offset, a first offset, an offset parameter, a first parameter, an offset field, the RO may also be a PRACH occasion.

The offset may be an msg1-ROFrequencyOffset.

The offset may take, comprise or have a value in a range between 0 and maxNrofPhysicalResourceBlocks−1.

The offset may be present in the PRACH configuration when there are at least 2 ROs configured in the frequency domain in the PRACH configuration, i.e., msg1-FDM=two.

At every RACH time position, there may be multiple ROs distributed across different LBT sub bands, whenever a RA event is triggered at a time occasion, the UE (103) may perform multiple LBT operations in parallel, and each of them is carried out on separate LBT sub bands, based on the outcome of LBT operations, the UE (103) may select one RO in a LBT sub band which has passed the LBT.

The offset may cover the bandwidth of a guard band between ROs in the PRACH configuration.

A value range of the offset may not comprise the bandwidth size of the guard band between two LBT sub bands/channels, i.e. the number of PRBs and/or the number of OFDM symbols of the guard band may be skipped in the setting of the offset.

The UE 103 may be configured with multiple serving cells/carriers within a same timing advance group.

A location parameter may indicate the location of the offset in the PRACH configuration, the location parameter may be comprised in the PRACH configuration.

The location parameter may be a msg1-FDM-per-sub band parameter.

The location parameter may be present in the PRACH configuration when more than two ROs are configured in the frequency domain, e.g. msg1-FDM=four.

ROs in the frequency domain may be distributed across different LBT bandwidth segments in the PRACH configuration.

PRACH/RACH resources may be configured across different LBT sub bands.

The obtaining the PRACH configuration may comprise that the UE 103 is configured with the PRAC configuration.

The PRACH configuration may be obtained e.g. by the UE 103 determining the PRAC configuration, by receiving it from the network node 101 directly or via some other node or memory unit, A number of PRBs and/or the number of OFDM symbols of the guard band may be included in the setting of the offset. Setting the offset may be referred to as determining the offset, calculating the offset. The setting of the offset may be performed by the UE 103 and/or the network node 101.

The applying the PRACH configuration may comprise initiating a RA procedure according to the obtained PRACH configuration, e.g. by transmitting a RA preamble message to the network node 101.

The communications system may be associated with at least one of NR-U, LTE LAA, eLAA, feLAA and/or MulteFire.

The communications system 100 may be a 2G network, a 3G network, a 4G network, a 5G network, a 6G network or any other legacy, current of future network.

A method performed by a network node 101 in a communications system 100, the method comprising:
providing 501a, 502b a PRACH configuration to a UE 103.

The method may comprise:
determining the PRACH configuration.

An offset may be located between two consecutive Random Access Channel, RACH, Occasions, ROs, in the PRACH configuration, the offset may be e.g. a frequency domain offset, a first offset, an offset parameter, a first parameter, an offset field.

The offset may be an msg1-ROFrequencyOffset.

The offset may take a value in a range between 0 and maxNrofPhysicalResourceBlocks−1.

The offset may be present in the PRACH configuration when there are at least 2 ROs configured in the frequency domain in the PRACH configuration, i.e., msg1-FDM=two.

At every RACH time position, there may be multiple ROs distributed across different LBT sub bands, whenever a RA event is triggered at a time occasion.

The offset may cover the bandwidth of a guard band between ROs in the PRACH configuration.

A value range of the offset may not comprise the bandwidth size of the guard band between two LBT sub bands/channels, i.e. the number of PRBs and/or the number of OFDM symbols of the guard band may be skipped in the setting of the offset.

A location parameter may indicate the location of the offset in the PRACH configuration. The location parameter may be comprised in the PRACH configuration.

The location parameter may be a msg1-FDM-per-sub band parameter.

The location parameter may be present when more than two ROs are configured in the frequency domain, e.g. msg1-FDM=four.

ROs in the frequency domain may be distributed across different LBT bandwidth segments in the PRACH configuration.

PRACH resources may be configured across different LBT sub bands.

The PRACH configuration may be provided to the UE 103 directly or via some other node or memory unit.

A number of PRBs and/or the number of OFDM symbols of the guard band may be included in the setting of the offset The method may comprise:
receiving 504b a RA message from the UE 103.

The communications system 100 may be associated with at least one of NR-U, LTE LAA, eLAA, feLAA and/or MulteFire.

The communications system 100 may be a 2G network, a 3G network, a 4G network, a 5G network, a 6G network or any other legacy, current of future network.

The network node 101 may be an NB, eNB, gNB, RNC, access node, RAN node, core network, CN, node, etc., or any other suitable network node.

A UE 103 is adapted to perform a method according to any of embodiments described herein.

A network node 101 is adapted to perform a method according to any of embodiments described herein.

A computer program comprising instructions which, when executed on at least one processor, cause the at least one processor to carry out the method according to any one of embodiments described herein. A carrier comprises the computer program of the embodiments herein. The carrier is one of an electronic signal, optical signal, radio signal or computer readable storage medium.

The embodiments herein relate to Channel Occupancy Time (COT), random access (RA).

The embodiments herein relate to a method to configure PRACH occasions across different LBT sub bands.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step.

Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments The embodiments herein are not limited to the above described embodiments. Various alternatives, modifications and equivalents may be used. Therefore, the above embodiments should not be taken as limiting the scope of the embodiments. A feature from one embodiment may be combined with one or more features of any other embodiment.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The term "configured to" used herein may also be referred to as "arranged to", "adapted to", "capable of" or "operative to".

It should also be emphasised that the steps of the methods may, without departing from the embodiments herein, be performed in another order than the order in which they appear herein.

Example Embodiments

1. A method performed by a User Equipment, UE, (103) in a communications system (100), the method comprising:
   obtaining (501a, 502b) a Physical Random Access Channel, PRACH, configuration; and
   applying (502a, 503b) the PRACH configuration.

2. The method according to any of the preceding embodiments, wherein an offset is located between two consecutive Random Access Channel, RACH, Occasions, ROs, in the PRACH configuration, the offset may be e.g. a frequency domain offset, a first offset, an offset parameter, a first parameter, an offset field, the RO may also be a PRACH occasion.

3. The method according to any of the preceding embodiments, wherein the offset is an msg1-ROFrequencyOffset.

4. The method according to any of the preceding embodiments, wherein the offset takes a value in a range between 0 and maxNrofPhysicalResourceBlocks−1.

5. The method according to any of the preceding embodiments, wherein the offset is present in the PRACH configuration when there are at least 2 ROs configured in the frequency domain in the PRACH configuration, i.e., msg1-FDM=two.

6. The method according to any of the preceding embodiments, wherein at every RACH time position, there are multiple ROs distributed across different LBT sub bands, whenever a RA event is triggered at a time occasion, the UE (103) performs multiple LBT operations in parallel, and each of them is carried out on separate LBT sub bands, based on the outcome of LBT operations, the UE (103) selects one RO in a LBT sub band which has passed the LBT.

7. The method according to any of the preceding embodiments, wherein the offset covers the bandwidth of a guard band between ROs in the PRACH configuration.

8. The method according to any of the preceding embodiments, wherein a value range of the offset does not comprise the bandwidth size of the guard band between two LBT sub bands/channels, i.e. the number of PRBs and/or the number of OFDM symbols of the guard band is skipped in the setting of the offset.

9. The method according to any of the preceding embodiments, wherein the UE (103) is configured with multiple serving cells/carriers within a same timing advance group.

10. The method according to any of the preceding embodiments, a location parameter indicates the location of the offset in the PRACH configuration, the location parameter may be comprised in the PRACH configuration.

11. The method according to any of the preceding embodiments, wherein the location parameter may be a msg1-FDM-per-sub band parameter.

12. The method according to any of the preceding embodiments, wherein the location parameter is present when more than two ROs are configured in the frequency domain, e.g. msg1-FDM=four.

13. The method according to any of the preceding embodiments, wherein ROs in the frequency domain are be distributed across different LBT bandwidth segments in the PRACH configuration.

14. The method according to any of the preceding embodiments, wherein PRACH resources are configured across different LBT sub bands.

15. The method according to any of the preceding embodiments, wherein the obtaining the PRACH configuration comprises that the UE (103) is configured with the PRAC configuration.

16. The method according to any of the preceding embodiments, wherein the PRACH configuration is obtained e.g. by the UE (103) determining the PRAC configuration, by receiving it from the network node (101) directly or via some other node or memory unit, 17. The method according to any of the preceding embodiments, wherein a number of PRBs and/or the number of OFDM symbols of the guard band is included in the setting of the offset 18. The method according to any of the preceding embodiments, wherein the applying the PRACH configuration comprises initiating a Random Access, RA, procedure according to the obtained PRACH configuration, e.g. by transmitting a RA preamble message to the network node (101).

19. The method according to any of the preceding embodiments, wherein the communications system (100) is associated with at least one of NR-U, LTE LAA, eLAA, feLAA and/or MulteFire.

20. The method according to any of the preceding embodiments, wherein the communications system (100) is a 2G network, a 3G network, a 4G network, a 5G network, a 6G network or any other legacy, current of future network.

21. A method performed by a network node (101) in a communications system (100), the method comprising:
providing (501*a*, 502*b*) a Physical Random Access Channel, PRACH, configuration to a User Equipment, UE, (103).

22. The method according to any of the preceding embodiments, comprising:
determining the PRACH configuration.

23. The method according to any of the preceding embodiments, wherein an offset is located between two consecutive Random Access Channel, RACH, Occasions, ROs, in the PRACH configuration, the offset may be e.g. a frequency domain offset, a first offset, an offset parameter, a first parameter, an offset field.

24. The method according to any of the preceding embodiments, wherein the offset is an msg1-ROFrequencyOffset.

25. The method according to any of the preceding embodiments, wherein the offset takes a value in a range between 0 and maxNrofPhysicalResourceBlocks−1.

26. The method according to any of the preceding embodiments, wherein the offset is present in the PRACH configuration when there are at least 2 ROs configured in the frequency domain in the PRACH configuration, i.e., msg1-FDM=two.

27. The method according to any of the preceding embodiments, wherein at every RACH time position, there are multiple ROs distributed across different LBT sub bands, whenever a RA event is triggered at a time occasion.

28. The method according to any of the preceding embodiments, wherein the offset covers the bandwidth of a guard band between ROs in the PRACH configuration.

29. The method according to any of the preceding embodiments, wherein a value range of the offset does not comprise the bandwidth size of the guard band between two LBT sub bands/channels, i.e. the number of PRBs and/or the number of OFDM symbols of the guard band is skipped in the setting of the offset.

30. The method according to any of the preceding embodiments, a location parameter indicates the location of the offset in the PRACH configuration, the location parameter may be comprised in the PRACH configuration.

31. The method according to any of the preceding embodiments, wherein the location parameter may be a msg1-FDM-per-sub band parameter.

32. The method according to any of the preceding embodiments, wherein the location parameter is present when more than two ROs are configured in the frequency domain, e.g. msg1-FDM=four.

33. The method according to any of the preceding embodiments, wherein ROs in the frequency domain are be distributed across different LBT bandwidth segments in the PRACH configuration.

34. The method according to any of the preceding embodiments, wherein PRACH resources are configured across different LBT sub bands.

35. The method according to any of the preceding embodiments, wherein the PRACH configuration provided to the UE (103) directly or via some other node or memory unit, 36. The method according to any of the preceding embodiments, wherein a number of PRBs and/or the number of OFDM symbols of the guard band is included in the setting of the offset 37. The method according to any of the preceding embodiments, comprising:
receiving (504*b*) a RA message from the UE (103).

38. The method according to any of the preceding embodiments, wherein the communications system (100) is associated with at least one of NR-U, LTE LAA, eLAA, feLAA and/or MulteFire.

39. The method according to any of the preceding embodiments, wherein the communications system (100) is a 2G network, a 3G network, a 4G network, a 5G network, a 6G network or any other legacy, current of future network.

40. The method according to any of the preceding embodiments, wherein the network node (101) is an NB, eNB, gNB, RNC, access node, RAN node, core network, CN, node, etc., or any other suitable network node.

41. An UE (103) adapted to perform a method according to any of embodiments 1-20.

42. A network node (101) adapted to perform a method according to any of embodiments 21-39.

43. A computer program comprising instructions which, when executed on at least one processor, cause the at least one processor to carry out the method according to any one of embodiments 1-20 and/or 21-39.

44. A carrier comprising the computer program of embodiment 43, wherein the carrier is one of an electronic signal, optical signal, radio signal or computer readable storage medium.

The invention claimed is:

1. A method performed by a User Equipment (UE) in a communications system, the method comprising:
obtaining a Physical Random Access Channel (PRACH) configuration, wherein the PRACH configuration indicates that the PRACH comprises at least one offset, wherein the at least one offset in the PRACH configuration causes consecutive Random Access Channel (RACH) occasions (ROs) in the frequency domain to be respectively and entirely within different Listen-Before-Talk (LBT) bandwidth segments of the same Bandwidth Part (BWP), wherein the at least one offset, as indicated by the PRACH configuration, adjusts a frequency offset between the consecutive ROs, covers a bandwidth of a guard band between the consecutive ROs, and overlaps at least part of two consecutive LBT bandwidth segments including the consecutive ROs; and
applying the PRACH configuration.

2. The method according to claim 1, wherein the at least one offset is located between two of the consecutive ROs in the frequency domain.

3. The method according to claim 2, wherein the at least one offset is an msg1-ROFrequencyOffset defined for a RACH-ConfigGeneric.

4. The method according to claim 1, wherein the at least one offset takes a value in a range between 0 and a maximum number of Physical Resource Blocks (PRB) minus 1.

5. The method according to claim 1, wherein the PRACH configuration comprises a location parameter, wherein the location parameter indicates a location of the at least one offset in the PRACH configuration.

6. The method according to claim 5, wherein the location parameter is an msg1-FDM-per-sub band parameter.

7. The method according to claim 5, wherein the location parameter is present when more than two ROs are configured in the frequency domain.

8. The method according to claim 1, wherein the step of obtaining the PRACH configuration comprises: determining the PRACH configuration or receiving the PRACH configuration from a network node directly or via some other node or memory unit.

9. The method according to claim 1, wherein the step of applying the PRACH configuration comprises: initiating a Random Access (RA) procedure according to the obtained PRACH configuration.

10. The method according to claim 1, wherein the UE is configured with multiple serving cells or carriers within a same timing advance group.

11. The method according to claim 1, wherein a value range of the at least one offset skips a bandwidth size of the guard band.

12. The method according to claim 11, wherein the guard band comprises at least a number of Physical Resource Blocks (PRBs) and a number of Orthogonal Frequency Division Multiplexing (OFDM) symbols.

13. The method according to claim 1, wherein the PRACH configuration may indicate that the PRACH comprises the at least one offset and at least one of one or multiple location parameters, one or multiple ROs, and one or multiple guard bands.

14. A method performed by a network node in a communications system, the method comprising:

providing a Physical Random Access Channel (PRACH) configuration to a User Equipment (UE) wherein the PRACH configuration indicates that the PRACH comprises at least one offset, wherein the at least one offset in the PRACH configuration causes consecutive Random Access Channel (RACH) occasions (ROs) in the frequency domain to be respectively and entirely within different Listen-Before-Talk (LBT) bandwidth segments of the same Bandwidth Part (BWP), wherein the at least one offset, as indicated by the PRACH configuration, adjusts a frequency offset between the consecutive ROs, covers a bandwidth of a guard band between the consecutive ROs, and overlaps at least part of two consecutive LBT bandwidth segments including the consecutive ROs in the PRACH configuration.

15. The method according to claim 14, wherein the method further comprises:

determining the PRACH configuration.

16. The method according to claim 14, wherein the at least one offset is located between two of the consecutive ROs in the frequency domain.

17. A User Equipment (UE) in a communications system, the UE is adapted to:

obtain a Physical Random Access Channel (PRACH) configuration, wherein the PRACH configuration indicates that the PRACH comprises at least one offset, wherein the at least one offset in the PRACH configuration causes consecutive Random Access Channel (RACH) occasions (ROs) in the frequency domain to be respectively and entirely within different Listen-Before-Talk (LBT) bandwidth segments of the same Bandwidth Part (BWP), wherein the at least one offset, as indicated by the PRACH configuration, adjusts a frequency offset between the consecutive ROs, covers a bandwidth of a guard band between the consecutive ROs, and overlaps at least part of two consecutive LBT bandwidth segments including the consecutive ROs in the PRACH configuration; and apply the PRACH configuration.

18. A network node in a communications system, the network node comprising:

a processor; and a memory, wherein the network node is adapted to:

provide a Physical Random Access Channel (PRACH) configuration to a User Equipment (UE) wherein the PRACH configuration indicates that the PRACH comprises at least one offset, wherein the at least one offset in the PRACH configuration causes consecutive Random Access Channel (RACH) occasions (ROs) in the frequency domain to be respectively and entirely within different Listen-Before-Talk (LBT) bandwidth segments of the same Bandwidth Part (BWP), wherein the at least one offset, as indicated by the PRACH configuration, adjusts a frequency offset between the consecutive ROs, covers a bandwidth of a guard band between the consecutive ROs, and overlaps at least part of two consecutive LBT bandwidth segments including the consecutive ROs in the PRACH configuration.

* * * * *